US010689471B2

(12) United States Patent
Gopalan et al.

(10) Patent No.: US 10,689,471 B2
(45) Date of Patent: Jun. 23, 2020

(54) MICRODENSE SEALS, COMPOSITIONS, AND METHODS OF MAKING THE SAME

(71) Applicant: Cooper-Standard Automotive Inc., Novi, MI (US)

(72) Inventors: Krishnamachari Gopalan, Troy, MI (US); Robert J. Lenhart, Fort Wayne, IN (US); Gending Ji, Waterloo (CA); Roland Herd-Smith, Brignancourt (FR)

(73) Assignee: COOPER-STANDARD AUTOMOTIVE, INC., Novi, MI (US)

( * ) Notice: Subject to any disclaimer, the term of this patent is extended or adjusted under 35 U.S.C. 154(b) by 129 days.

(21) Appl. No.: 15/836,402

(22) Filed: Dec. 8, 2017

(65) Prior Publication Data
US 2018/0163031 A1 Jun. 14, 2018

Related U.S. Application Data

(60) Provisional application No. 62/497,954, filed on Dec. 10, 2016.

(51) Int. Cl.
| | | |
|---|---|---|
| *C08F 255/02* | (2006.01) |
| *C08J 9/00* | (2006.01) |
| *C08J 3/24* | (2006.01) |
| *C09K 3/10* | (2006.01) |
| *C08K 3/011* | (2018.01) |
| *C08J 9/228* | (2006.01) |
| *C08K 3/36* | (2006.01) |
| *C08L 23/08* | (2006.01) |
| *C08L 23/12* | (2006.01) |
| *C08K 5/00* | (2006.01) |
| *C08L 23/14* | (2006.01) |
| *C08L 23/16* | (2006.01) |

(52) U.S. Cl.
CPC .............. *C08F 255/02* (2013.01); *C08J 3/24* (2013.01); *C08J 9/0061* (2013.01); *C08J 9/228* (2013.01); *C08K 3/011* (2018.01); *C08K 3/36* (2013.01); *C08K 5/0025* (2013.01); *C08L 23/0815* (2013.01); *C08L 23/12* (2013.01); *C08L 23/14* (2013.01); *C08L 23/142* (2013.01); *C08L 23/16* (2013.01); *C09K 3/10* (2013.01); *C08F 2500/21* (2013.01); *C08J 2351/06* (2013.01); *C08J 2423/08* (2013.01); *C08J 2423/12* (2013.01); *C08J 2423/14* (2013.01); *C08L 2205/025* (2013.01); *C08L 2312/08* (2013.01); *C09K 2003/1068* (2013.01); *C09K 2200/0494* (2013.01); *C09K 2200/062* (2013.01)

(58) Field of Classification Search
CPC ...... C08L 23/0815; C08L 23/12; C08L 23/14; C08L 2312/08; C08L 2205/025; C08K 5/0025; C08J 9/0061; C08J 2423/08; C08J 2423/12; C08J 2423/14; C08F 255/02

See application file for complete search history.

(56) References Cited

U.S. PATENT DOCUMENTS

| | | | |
|---|---|---|---|
| 3,644,315 A | 2/1972 | Gardner et al. |
| 3,646,155 A | 2/1972 | Scott |
| 3,682,201 A | 8/1972 | Atwell et al. |
| 4,076,698 A | 2/1978 | Anderson et al. |
| 4,412,042 A | 10/1983 | Matsuura et al. |
| 4,419,844 A | 12/1983 | Kreisfeld |
| 4,515,210 A | 5/1985 | Smith et al. |
| 4,591,606 A * | 5/1986 | Bergstrom ............. C08J 9/02 |
| | | | 521/79 |
| 4,614,208 A | 9/1986 | Skarelius |
| 4,618,654 A | 10/1986 | Schmidtchen et al. |
| 4,798,864 A | 1/1989 | Topcik |
| 4,803,244 A | 2/1989 | Umpleby |
| 4,806,594 A | 2/1989 | Gross et al. |
| 4,818,789 A | 4/1989 | Tomko et al. |
| 4,870,136 A | 9/1989 | Yagi et al. |
| 4,894,281 A | 1/1990 | Yagi et al. |
| 4,927,184 A | 5/1990 | Bourjot et al. |
| 4,927,871 A | 5/1990 | Ohori et al. |

(Continued)

FOREIGN PATENT DOCUMENTS

| | | |
|---|---|---|
| EP | 0913427 A1 | 6/1999 |
| EP | 920876 A2 | 6/1999 |

(Continued)

OTHER PUBLICATIONS

European Patent Office, "International Search Report and the Written Opinion of the International Searching Authority," PCT Application No. PCT/US2017/065442, dated Mar. 16, 2018 (10 pages).
European Patent Office, "International Search Report and the Written Opinion of the International Searching Authority," PCT Application No. PCT/US2017/065451, dated Mar. 16, 2018 (10 pages).
European Patent Office, "International Search Report and the Written Opinion of the International Searching Authority," PCT Application No. PCT/US2017/065463, dated Mar. 16, 2018 (10 pages).
European Patent Office, "International Search Report and the Written Opinion of the International Searching Authority," PCT Application No. PCT/US2017/065360, dated Mar. 26, 2018 (11 pages).

(Continued)

*Primary Examiner* — Irina S Zemel
(74) *Attorney, Agent, or Firm* — Paschall & Associates; Mary Jo Boldingh

(57) ABSTRACT

A microdense sealing member is provided. The microdense sealing member includes a composition having a foamed silane-crosslinked polyolefin elastomer with a density less than 0.70 g/cm³. The microdense sealing member can exhibit a compression set of from about 5.0% to about 35.0% measured according to ASTM D 395 (22 hrs @ 70° C.). The foamed silane-crosslinked polyolefin elastomer can be produced from a blend including a first polyolefin having a density less than 0.86 g/cm³, a second polyolefin having a crystallinity less than 60° C., a silane crosslinker, a grafting initiator, a condensation catalyst, and a microencapsulated foaming agent.

19 Claims, 11 Drawing Sheets

(56) References Cited

U.S. PATENT DOCUMENTS

| | | | |
|---|---|---|---|
| 5,145,628 A | 9/1992 | Karg et al. | |
| 5,252,660 A | 10/1993 | Hazan et al. | |
| 5,266,627 A | 11/1993 | Meverden et al. | |
| 5,272,236 A | 12/1993 | Lai et al. | |
| 5,278,272 A | 1/1994 | Lai et al. | |
| 5,741,858 A | 4/1998 | Brann et al. | |
| 5,814,254 A | 9/1998 | Bisconti | |
| 5,824,718 A | 10/1998 | Penfold et al. | |
| 5,837,174 A | 11/1998 | Bisconti | |
| 5,868,981 A | 2/1999 | Bisconti | |
| 5,880,192 A | 3/1999 | Brown et al. | |
| 5,883,144 A | 3/1999 | Bambara et al. | |
| 5,911,940 A * | 6/1999 | Walton | B29C 44/08 264/415 |
| 5,974,694 A | 11/1999 | Vecchiola | |
| 5,986,002 A | 11/1999 | Hwang et al. | |
| 5,994,474 A | 11/1999 | Wey et al. | |
| 6,048,935 A | 4/2000 | Penfold et al. | |
| 6,068,026 A | 5/2000 | Garois | |
| 6,235,848 B1 | 5/2001 | Bickert et al. | |
| 6,316,512 B1 | 11/2001 | Bambara et al. | |
| 6,361,842 B1 | 3/2002 | Stachowiak | |
| 6,395,791 B1 | 5/2002 | Chaudhary et al. | |
| 6,399,708 B2 | 6/2002 | Valligny et al. | |
| 6,476,132 B1 | 11/2002 | Abdou-Sabet et al. | |
| 6,652,937 B1 | 11/2003 | Guo et al. | |
| 6,794,453 B2 | 9/2004 | Jackson et al. | |
| 6,828,011 B2 | 12/2004 | Yu et al. | |
| 6,864,315 B1 | 3/2005 | Hakuta et al. | |
| 7,041,744 B2 | 5/2006 | Palmlöf et al. | |
| 7,279,529 B2 | 10/2007 | Rogge et al. | |
| 7,281,547 B2 | 10/2007 | Cleveland et al. | |
| 7,834,115 B2 | 11/2010 | Johansson et al. | |
| 8,017,710 B2 | 9/2011 | Sultan et al. | |
| 8,205,391 B2 | 6/2012 | Aritake et al. | |
| 8,299,166 B2 | 10/2012 | Carlsson | |
| 8,318,864 B2 | 11/2012 | Harris et al. | |
| 8,387,625 B2 | 3/2013 | Kawata et al. | |
| 8,728,600 B1 | 5/2014 | Hayes | |
| 8,835,548 B2 | 9/2014 | Esseghir et al. | |
| 9,115,620 B2 | 8/2015 | Doneva et al. | |
| 9,127,110 B2 | 9/2015 | Sugita et al. | |
| 9,387,625 B2 | 7/2016 | Esseghir et al. | |
| 2004/0006179 A1 | 1/2004 | Graf | |
| 2004/0045619 A1 | 3/2004 | Backman et al. | |
| 2004/0103948 A1 | 6/2004 | Scheelen et al. | |
| 2004/0157053 A1 | 8/2004 | Yu et al. | |
| 2004/0265524 A1 | 12/2004 | Wideman et al. | |
| 2004/0265563 A1 | 12/2004 | Sakai et al. | |
| 2005/0095374 A1 | 5/2005 | Cothran et al. | |
| 2005/0100747 A1 | 5/2005 | Gopalan et al. | |
| 2006/0185750 A1 | 8/2006 | Mestemacher | |
| 2007/0027250 A1 | 2/2007 | Joseph et al. | |
| 2007/0122570 A1 | 3/2007 | Honda | |
| 2008/0023215 A1 | 1/2008 | Uehara et al. | |
| 2008/0097038 A1 | 4/2008 | Biscoglio et al. | |
| 2008/0306217 A1 | 12/2008 | Karjala et al. | |
| 2008/0314470 A1 | 12/2008 | Trace et al. | |
| 2009/0143531 A1 | 6/2009 | Ouhadi et al. | |
| 2010/0209705 A1 | 8/2010 | Lin et al. | |
| 2010/0249256 A1 | 9/2010 | Moscardi et al. | |
| 2011/0144277 A1 | 6/2011 | Weissenbach et al. | |
| 2011/0144278 A1 | 6/2011 | Weissenbach et al. | |
| 2011/0146792 A1 | 6/2011 | Wu et al. | |
| 2011/0172367 A1 | 7/2011 | Backer et al. | |
| 2011/0259464 A1 | 10/2011 | Lacroix et al. | |
| 2012/0042980 A1 | 2/2012 | Mezzalira et al. | |
| 2012/0145275 A1 | 6/2012 | Seebold et al. | |
| 2012/0171496 A1 | 7/2012 | Esseghir et al. | |
| 2012/0178867 A1 | 7/2012 | Esseghir et al. | |
| 2012/0312581 A1 | 12/2012 | Yasuda et al. | |
| 2014/0191161 A1 | 7/2014 | Amako et al. | |
| 2015/0047264 A1 | 2/2015 | Kobayashi | |
| 2016/0174655 A1 | 6/2016 | Schiller et al. | |
| 2016/0208060 A1 | 7/2016 | Nishiguchi et al. | |
| 2016/0251535 A1 | 9/2016 | Chaudhary et al. | |
| 2017/0130876 A1 | 5/2017 | Gopalan et al. | |

FOREIGN PATENT DOCUMENTS

| | | |
|---|---|---|
| EP | 0944670 B1 | 4/2003 |
| EP | 1820821 A1 | 8/2007 |
| EP | 2083047 A1 | 7/2009 |
| EP | 2143984 A1 | 1/2010 |
| EP | 2407496 A1 | 1/2012 |
| EP | 2520422 A1 | 11/2012 |
| EP | 2546291 A1 | 1/2013 |
| EP | 2395878 B1 | 4/2013 |
| JP | 2013119583 A | 6/2013 |
| WO | 9001503 A1 | 2/1990 |
| WO | 2004031292 A2 | 4/2004 |
| WO | 2005005532 A1 | 1/2005 |
| WO | 2010074916 A1 | 7/2010 |
| WO | 2013134945 A1 | 9/2013 |
| WO | 2015054893 A1 | 4/2015 |
| WO | 2015126931 A1 | 8/2015 |
| WO | 2016004204 A1 | 1/2016 |

OTHER PUBLICATIONS

European Patent Office, "International Search Report and the Written Opinion of the International Searching Authority," PCT Application No. PCT/US2017/065376, dated Feb. 22, 2018 (11 pages).

European Patent Office, "International Search Report and the Written Opinion of the International Searching Authority," PCT Application No. PCT/US2017/065386, dated Mar. 22, 2018 (11 pages).

European Patent Office, International Search Report and Written Opinion of the International Searching Authority, PCT Application No. PCT/US2017/065459, dated May 25, 2018 (16 pages).

European Patent Office, International Search Report and Written Opion of the International Searching Authority, PCT Application No. PCT/US2017/065404, dated Mar. 16, 2018 (10 pages).

Arhart, Richard J., The Chemistry of Ethylene Propylene Insulation—PartII, IEEE Electrical Insulation Magazine 9 (6), 1993, 11-14.

Adachi et al., Controllable Sllane Water-Cross-Linking Kinetics and Curability of Ethylene-Propylene Copolymer by Amine Compounds, Industrial and Engineering Chemistry Research, 47, 2008, 1812-1819.

Dow Corning, Plastics, Polymerization and Rubber, 2009, 5 pages.

Morshedian et al., Polyethylene Cross-linking by Two-step Silane Method: A Review, Iranian Polymer Journal, 18 (2), 2009, 103-128.

Morshedian et al., Silane grafting of polyethylene: effect of molecular structure, physical form, blending, and antioxidants, e-Polymers, No. 24, 2009, 1-17.

Sirisinha et al., The effect of silane carriers on silane grafting of high-desity polyethylene and properties of crosslinked products, Poymer Testing 29, (2010), 958-965.

Why Use Silane Crosslinking Technology, Jun. 8, 2012, <https://wenku.baidu.com/view/3454a9a7b0717fd5360cdcb4.

Gopalan et al., U.S. Appl. No. 14/305,918, filed Jun. 16, 2014.

Gopalan et al., U.S. Appl. No. 14/449,702, filed Aug. 1, 2014.

International Searching Authority, International Search Report and Written Opinion for International Application No. PCT/US2015/038830, dated Sep. 23, 2015, 12 pages.

\* cited by examiner

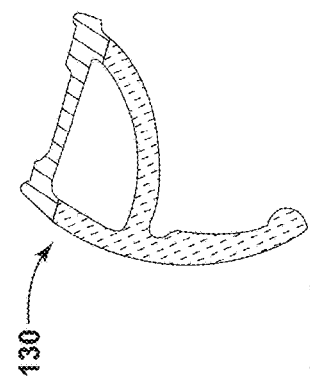
FIG. 5C
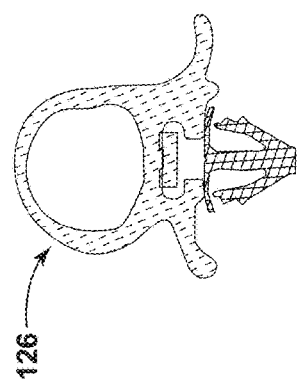
FIG. 5B
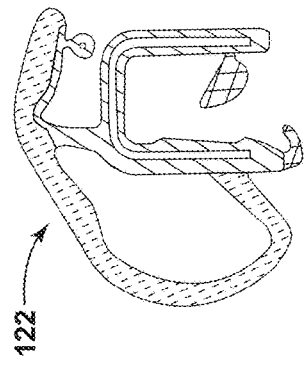
FIG. 5A
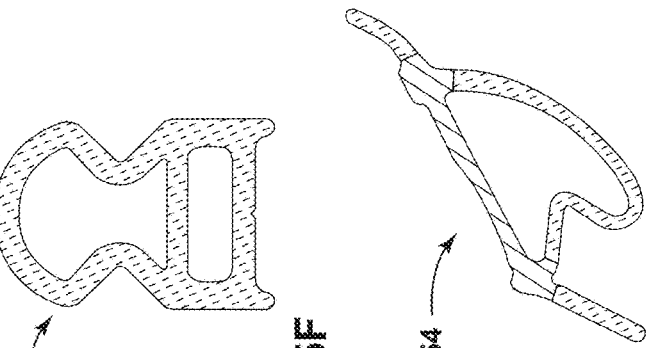
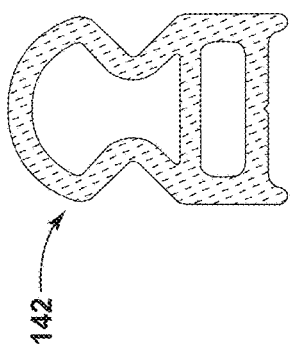
FIG. 5F
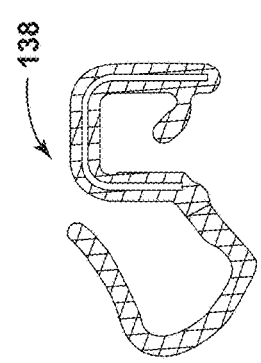
FIG. 5E
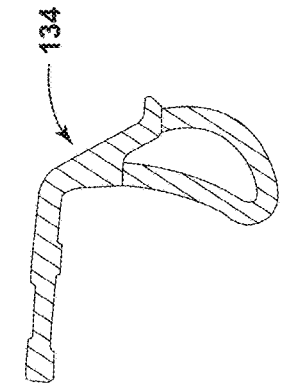
FIG. 5D
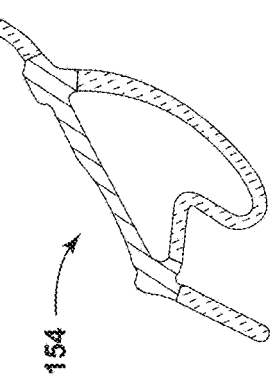
FIG. 5I
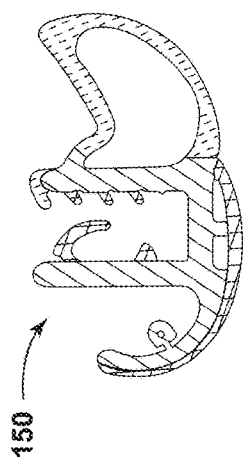
FIG. 5H
FIG. 5G Initiation Propagation Chain Transfer Hydrolysis Condensation/Crosslinking

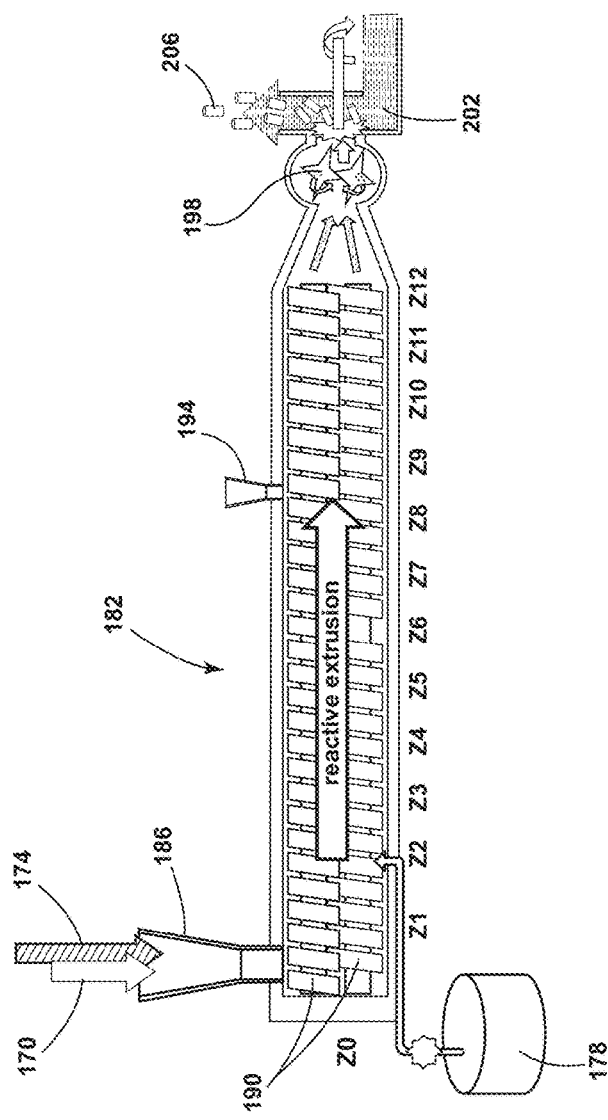
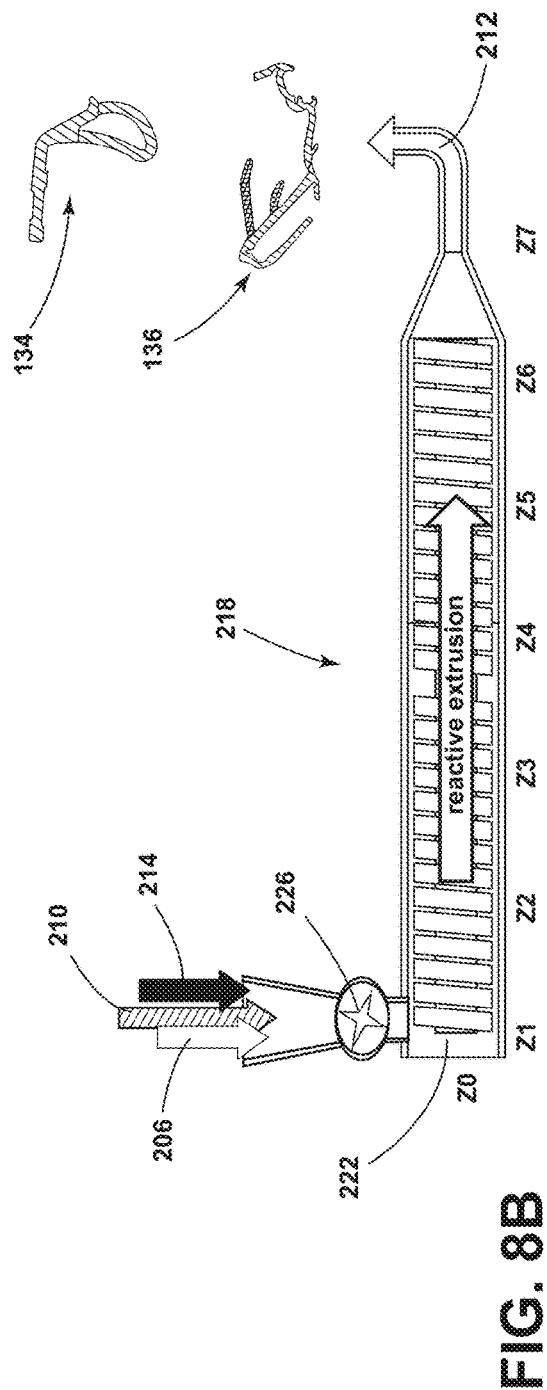
FIG. 8A
FIG. 8B

MICRODENSE SEALS, COMPOSITIONS, AND METHODS OF MAKING THE SAME

CROSS-REFERENCE TO RELATED APPLICATION

This application claims priority under 35 U.S.C. § 119(e) to U.S. Provisional Patent Application No. 62/497,954 filed Dec. 10, 2016, entitled "WEATHERSTRIP, COMPOSITION INCLUDING SILANE-GRAFTED POLYOLEFIN, AND PROCESS OF MAKING A WEATHERSTRIP," which is herein incorporated by reference in its entirety.

FIELD OF THE DISCLOSURE

The disclosure generally relates to compositions that may be used to form microdense seals, and more particularly, to compositions used to form microdense seals in vehicles and methods for manufacturing these compositions and seals.

BACKGROUND OF THE DISCLOSURE

Automobile manufacturers are continually looking for ways to improve the fuel efficiency of automobiles. One way to accomplish this involves reducing the weight of the components used to construct automobiles. A commonly used method for reducing the weight of automotive weatherstrip formulations involves the use of foaming agents. The addition of foaming agents produces porosity in the cross section of the weatherstrip, thus providing a potentially dramatic savings in weight.

Automotive weatherstrip formulations can be composed of thermoplastic elastomers such as thermoplastic vulcanizates (TPV) or styrene-ethylene/butylene-styrene copolymer (SEBS) to achieve desired performance. Thermoset elastomers such as ethylene propylene diene monomer (EPDM) rubber can also be used for this type of application. Dense TPV and SEBS materials typically have a density in the range of 0.9 g/cc to 1.1 g/cc and are frequently blown using foaming agents to around 0.75 g/cc to 0.80 g/cc for microdense applications. Dense EPDM rubber formulations tend to have higher densities in the range of 1.1 g/cc to 1.3 g/cc and are blown using foaming agents to 0.85 g/cc-1.1 g/cc for microdense applications. Both approaches can be used to manufacture body-mounted weatherstrips for automobiles, but are relatively high in cost and result in seals with relatively high densities that do not offer significant vehicular weight savings.

Further, EPDM-based seals are likewise costly from a process stand point. The EPDM constituent ingredients are typically mixed together in a one- or two-step process prior to shipping to an extrusion facility. At the extrusion facility, the ingredients and rubber compound(s) are extruded together to form a final material, which is subsequently formed into automotive glass contacting weatherstrips. Hence, the extrusion process used to manufacture weatherstrips can include many stages, depending on the type of EPDM or other types of resins, and may additionally require long lengths of curing ovens. For example, extrusion lines of up to 80 yards in length that are powered by natural gas and/or electricity may be required. Much of the natural gas and/or electricity energy sources are used to fuel hot air ovens, microwaves, infrared ovens, or other types of equipment used to vulcanize the EPDM rubber compounds. The vulcanization process also produces fumes that must be vented and monitored to comply with environmental requirements. Overall, the processes used to fabricate these traditional EPDM-based seals can be very time consuming, costly, and environmentally unfriendly.

Mindful of the drawbacks associated with current TPV-, SEBS- and EPDM-based sealing technologies, the automotive industry has a need for the development of new compositions and methods for manufacturing weatherstrips, particularly foamed seals and sealing elements, that are simpler, lighter in weight, lower in cost, have superior long-term load loss (LLS) (i.e., ability to seal the glass and window for a long term), and are more environmentally friendly.

SUMMARY OF THE DISCLOSURE

According to one aspect of the present disclosure, a microdense sealing member is disclosed. The microdense sealing member includes a composition comprising a foamed silane-crosslinked polyolefin elastomer having a density less than 0.70 g/cm$^3$. The microdense sealing member exhibits a compression set of from about 5.0% to about 35.0%, as measured according to ASTM D 395 (22 hrs @ 70° C.).

According to another aspect of the present disclosure, a foamed silane-crosslinked polyolefin blend is disclosed. The foamed silane-crosslinked polyolefin blend includes a first polyolefin having a density less than 0.86 g/cm$^3$, a second polyolefin having a percent crystallinity less than 40%, a silane crosslinker, and a microencapsulated foaming agent. The foamed silane-crosslinked polyolefin blend exhibits a compression set of from about 5.0% to about 35.0%, as measured according to ASTM D 395 (22 hrs @ 70° C.). The foamed silane-crosslinked polyolefin blend upon curing has a density less than 0.70 g/cm$^3$.

According to a further aspect of the present disclosure, a method for making a microdense sealing member is disclosed. The method includes the steps of: extruding a first polyolefin having a density less than 0.86 g/cm$^3$, a second polyolefin having a crystallinity less than 40%, a silane crosslinker, and a grafting initiator together to form a silane-grafted polyolefin blend; extruding the silane-grafted polyolefin blend, a condensation catalyst, and a microencapsulated foaming agent together to form a foamed silane-crosslinkable polyolefin blend; molding the foamed silane-crosslinkable polyolefin blend into an uncured sponge sealing element; and crosslinking the foamed crosslinkable-polyolefin blend at an ambient temperature and an ambient humidity to form the element into a microdense sealing member having a density from about 0.60 g/cm$^3$ to about 0.69 g/cm$^3$ and comprising a foamed silane-crosslinked polyolefin blend. The microdense sealing member exhibits a compression set of from about 5.0% to about 35.0%, as measured according to ASTM D 395 (22 hrs @ 70° C.).

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 5A-5I are a variety of cross-sectional views of the representative microdense seals provided in FIG. 4, according to some aspects of the present disclosure;

FIG. 8A is a schematic cross-sectional view of a reactive twin-screw extruder according to some aspects of the present disclosure;

FIG. 8B is a schematic cross-sectional view of a single-screw extruder according to some aspects of the present disclosure;

DETAILED DESCRIPTION OF THE EMBODIMENTS

Figure 1:
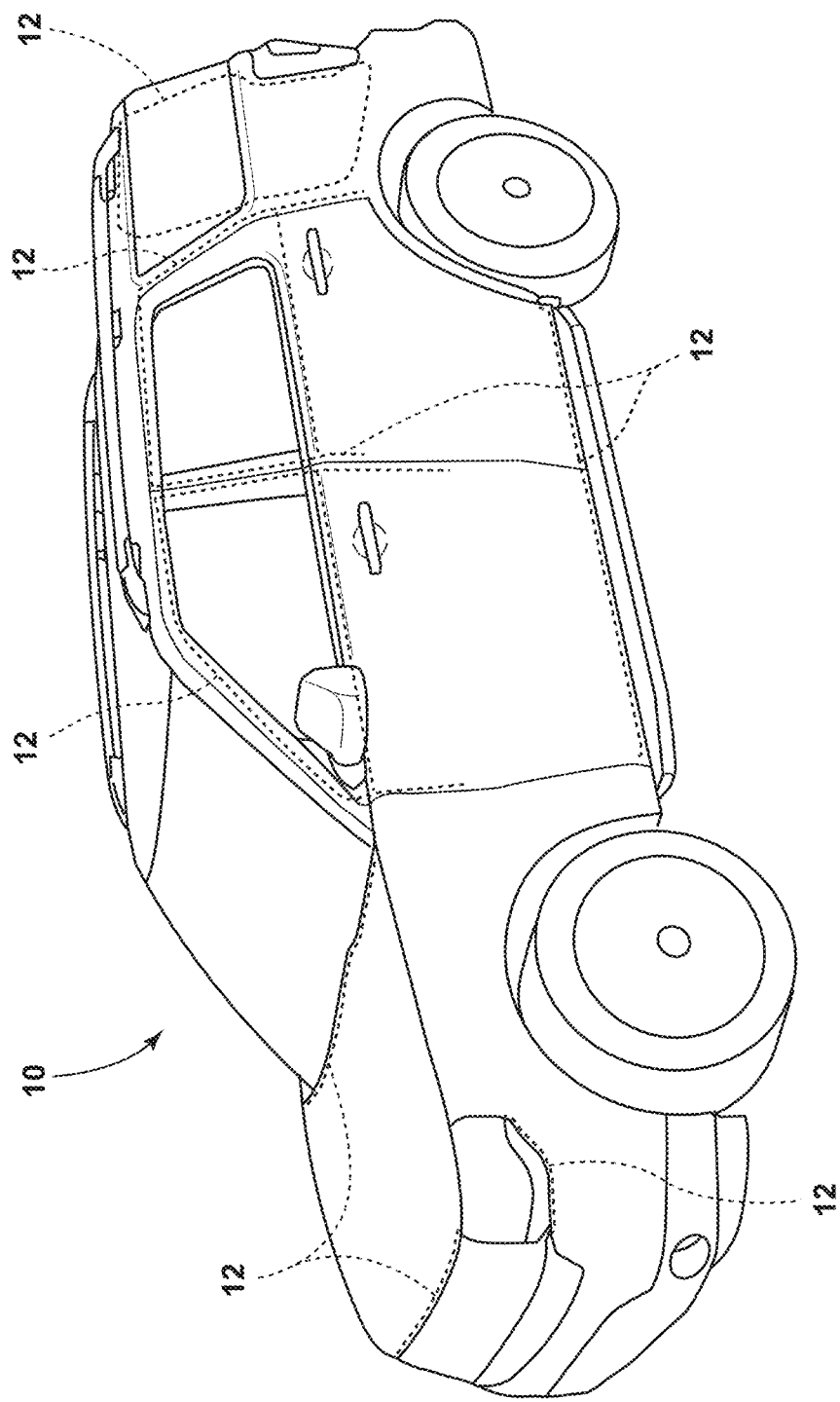
FIG. 1 is a front perspective view of a vehicle having a plurality of weatherstrip microdense seals according to some aspects of the present disclosure.

For purposes of description herein the terms "upper," "lower," "right," "left," "rear," "front," "vertical," "horizontal," and derivatives thereof shall relate to the microdense seals of the disclosure as oriented in the vehicle shown in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5I, microdense sealing members 12 are provided. In general, the microdense sealing members 12 of the disclosure include a composition having a foamed silane-crosslinked polyolefin elastomer with a density less than 0.70 g/cm$^3$. The microdense sealing member can exhibit a compression set of from about 5.0% to about 35.0% measured according to ASTM D 395 (22 hrs @ 70° C.). The foamed silane-crosslinked polyolefin elastomer can be produced from a blend including a first polyolefin having a density less than 0.86 g/cm$^3$, a second polyolefin having a crystallinity less than 60° C., a silane crosslinker, a grafting initiator, a condensation catalyst, and a microencapsulated foaming agent.

The disclosure herein utilizes low density, highly elastic polymers such as silane-crosslinked polyolefin elastomers that are crosslinked through silane grafting to produce foamed, microdense sealing members and elements. The microdense portions of microdense sealing members 12 are not typically designed to be used as a primary functional sealing surface; rather, these portions are intended to be used as a lightweight body member that can be coupled to one or more functional portions of a sealing member 12 including, for example, sponge silane-crosslinked polyolefin elastomer portions and/or dense silane-crosslinked polyolefin elastomer portions. As such, the "microdense sealing members 12" contemplate at least one microdense portion of a sealing member and, optionally, can further include additional, functional portions, such as sponge and dense silane-crosslinked polyolefin elastomer aspects (as defined below in this disclosure). The density of the foamed, microdense silane-crosslinked polyolefin elastomers range from 0.60 g/cc to 0.69 g/cm$^3$. Further, the methods for making these elastomers can provide up to an additional 33% reduction in weight of sealing members with microdense portions that comprise these foamed silane-crosslinked polyolefins.

Referring to FIG. 1, vehicle 10 is provided having a variety of microdense sealing members 12 (e.g., weatherstrip seals). The vehicle 10 is shown as a sports utility vehicle (SUV) but the type of vehicle 10 is not meant to be limiting and can include, for example, a car, minivan, truck, commercial vehicle, or any other wheeled motorized vehicle. The vehicle 10 and the microdense sealing members 12 described herein are for illustrative purposes only and are not to be construed as limiting to only vehicles 10, for example, the microdense sealing members 12 could additionally be used in the building construction industry, the transportation industry, the electronics industry, the footwear industry, and the roofing industry.

The term "weatherstrip", as used herein, is an example of a "seal." The term "seal", as used herein, means a device or substance that is used to join two surfaces together. The surfaces used herein may include the various types of surfaces found on, for example, automobiles, structures, windows, roofs, electronic devices, footwear, and/or any other industry or product where seals can be used to help minimize and/or eliminate the transmission of noise, water, or particulate matter through the respective surfaces.

As noted earlier, the seals used for the various microdense sealing members 12 (e.g., weatherstrip seals 26) disclosed herein may be fabricated or manufactured from one or more different silane-crosslinked polyolefin elastomers. In aspects where the microdense sealing member includes more than one type of silane-crosslinked polyolefin elastomer, the different silane-crosslinked polyolefin elastomers can each make up one or more different strips, gripping portions, bodies, pins, and/or surfaces of the microdense seal. As noted earlier, the micro-dense portions of the sealing members 12 are generally not used as functional sealing portions per se; rather, they offer a lightweight material option to be used as body members that couple or connect to the functional aspects of the seal, e.g., sponge and/or dense portions. As used herein, a "microdense" silane-crosslinked polyolefin elastomer includes a microencapsulated foaming agent and has a density less than 0.70 g/cm$^3$ or, more specifically, a density from about 0.60 g/cm$^3$ to about 0.69 g/cm$^3$. The synthesis and processing methods used to produce this microdense silane-crosslinked polyolefin elastomer and its specialized material properties are disclosed herein.

In other aspects, the microdense sealing member 12 may additionally include one or more portions made from a dynamic silane-crosslinked polyolefin elastomer (also referred herein as a "sponge silane-crosslinked polyolefin elastomer"), as typically used in dynamic seals. Dynamic seals are generally used when there is motion between the mating surfaces being sealed. As used herein, a "dynamic silane-crosslinked polyolefin elastomer" includes a chemical and/or physical foaming agent and has a density less than 0.60 g/cm$^3$ or, more specifically, a density from about 0.50 g/cm$^3$ to about 0.59 g/cm$^3$.

In still other aspects, the microdense sealing member 12 may additionally include one or more portions made from a static silane-crosslinked polyolefin elastomer, as typically used in static seals. Static seals generally have little or no relative motion between the mating surfaces being sealed. In some aspects, the static seals are made entirely of a dense silane-crosslinked polyolefin elastomer. As used herein, a "dense silane-crosslinked polyolefin elastomer" has a density of less than 0.90 g/cm$^3$.

Figure 2:
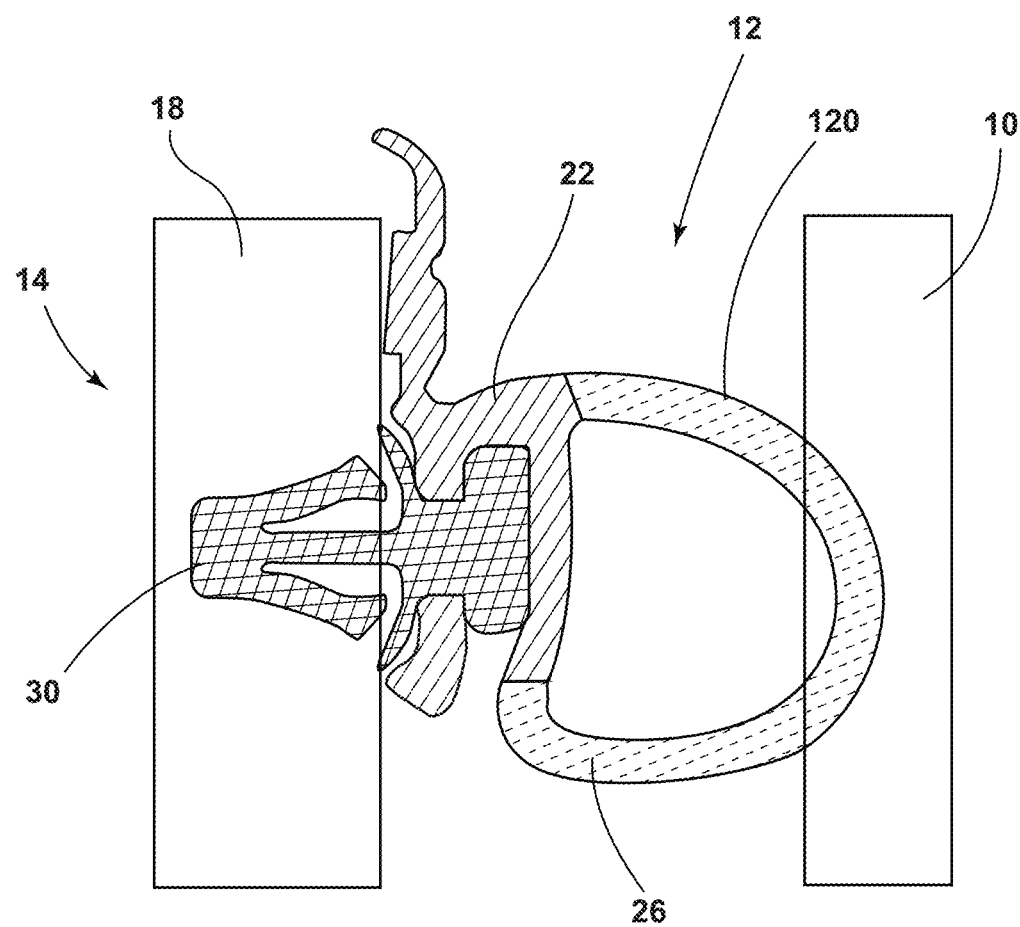
FIG. 2 is a cross-sectional view of a primary weatherstrip seal according to some aspects of the present disclosure.

Referring now to FIG. 2, a cross-sectional representation of a microdense sealing member 12 is depicted in the form of a primary weatherstrip seal 120. In particular, the weatherstrip seal 120 may include a combination of various types of silane-crosslinked polyolefin elastomers including a main body member 22 comprising a microdense silane-crosslinked polyolefin elastomer, a bulb member 26 comprising a sponge silane-crosslinked polyolefin elastomer, and a retainer pin 30 comprising a dense silane-crosslinked polyolefin elastomer. The main body member 22 can be secured to the door panel 18 or other portion of the door 14 (see FIG. 2) of the vehicle 10 by any conventional or known means for doing so, including but not limited to, for example, the retainer pin 30, though this is not a limiting feature of the disclosure. As such, any means known in the relevant art for securing the primary weatherstrip seal 120 to a surface of the vehicle 10 may be used. The sponge bulb member 26 can provide a seal between the door 14 and other portions of the vehicle 10, for example, when the primary weatherstrip seal 120 is brought into contact and compressed between the two respective surfaces. As will be appreciated by one skilled in the art, the body of the vehicle 10 and the inner portion of the door 14 represented in FIG. 2 may be substituted by any two adjoining surfaces that would benefit from the presence of one or more primary weatherstrip seals 120 impervious to environmental conditions. As such, the body of the vehicle 10 and the inner portion of the door 14 are merely representative of adjoining surfaces and are not considered to be limiting features of the disclosure. Other locations where primary weatherstrip seals 120 could be applied include, for example, door panels, body seals, trunk lid seals, door-to-door seals, rocker seals, and hood seals (e.g., as provided in FIG. 4).

Figure 3:
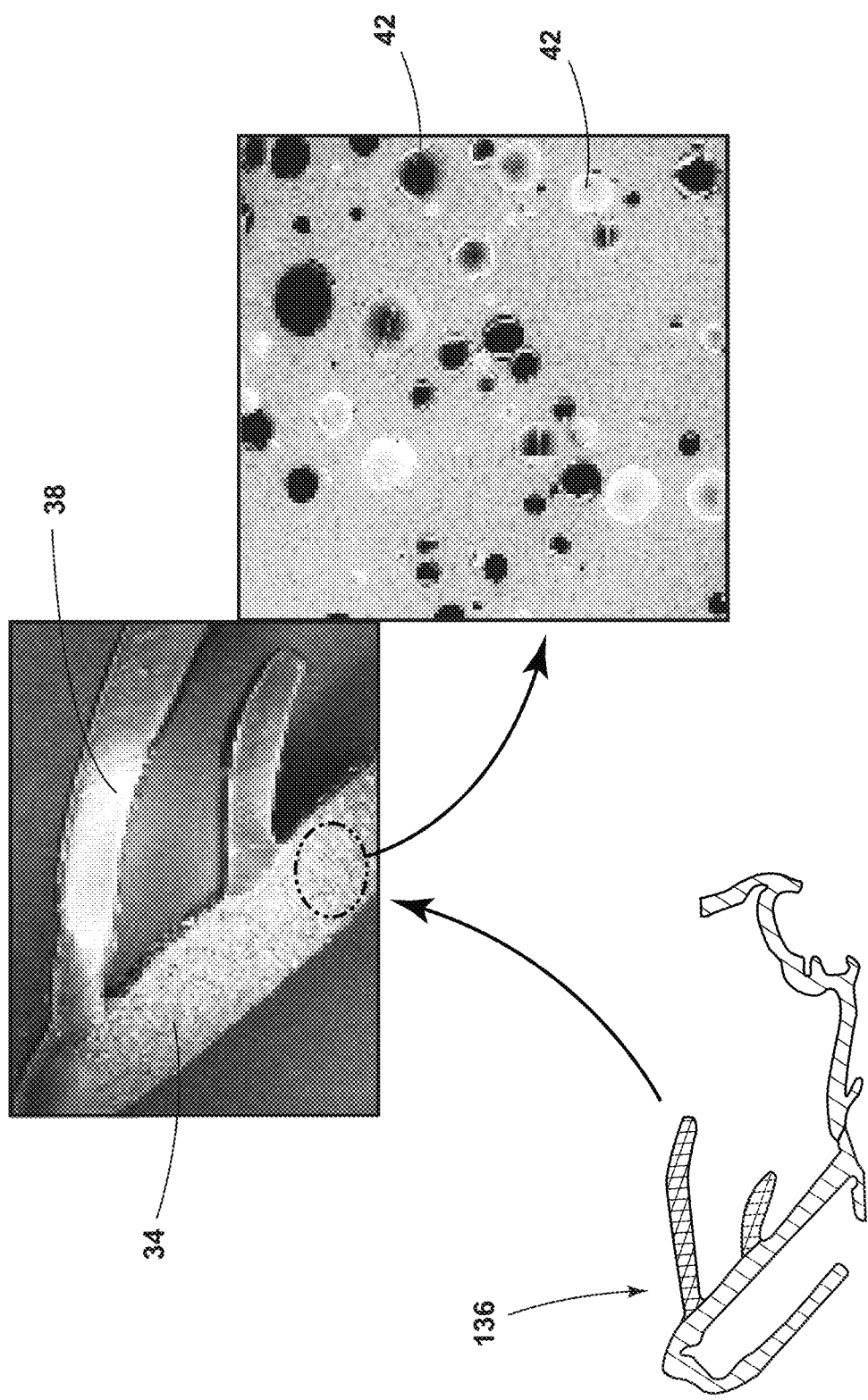
FIG. 3 is a schematic cross-sectional view of a microdense seal accompanied with cross-sectional and enlarged views of an actual microdense seal for illustration, according to some aspects of the present disclosure.

Referring now to FIG. 3, a schematic cross-sectional view of a microdense sealing member 136 (i.e., as exemplary of the sealing members 12 shown in FIGS. 1 and 2) is provided, and accompanied with cross-sectional micrographs of an actual microdense sealing member. As is evident from the micrograph, the microdense sealing member 136 includes a microdense seal portion 34 that comprises a microdense silane-crosslinked polyolefin elastomer and a dense seal portion 38 that comprises a dense silane-crosslinked polyolefin elastomer. Notably, the enlarged micrograph demonstrates that the microdense seal portion 34 includes porosity 42 that can be developed through the incorporation of foaming agents in the elastomer during processing, as discussed in greater detail below. As also outlined below, and as evident in FIG. 3, the pore size of the microdense portion can be adjusted or varied by the choice of foaming agent and/or processing conditions.

Figure 4:
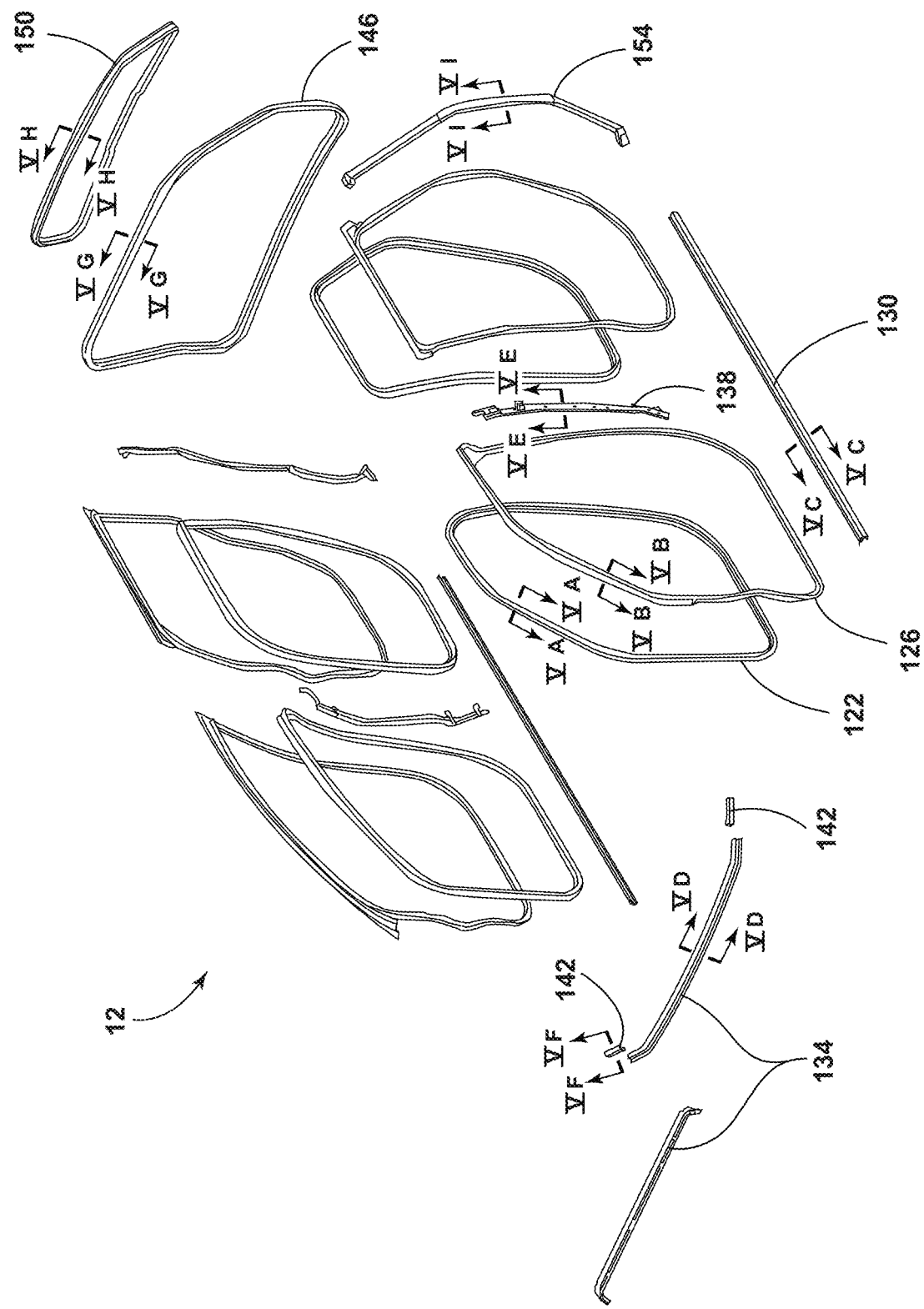
FIG. 4 is a schematic view of a plurality of microdense seals used in the vehicle presented in FIG. 1 according to some aspects of the present disclosure.

Referring to FIG. 4 and FIGS. 5A-5H, an isolated exploded schematic view of a plurality of microdense sealing members 12 is provided. As shown, these microdense sealing members 12 are presented in the form of various weatherstrip seals (e.g., seals 122, 126, 130, 134, 138, 142, 146, 150, and 154) that can be used in the vehicle 10 (see FIG. 1) is provided. The weatherstrip seals provided in FIG. 4 are configured to be mounted between moving portions of the vehicle 10 such as doors and body portions where they support the dense and dynamic/foam portions that come into contact with each other in order to help minimize and/or eliminate the transmission of noise, water, or particulate matter. The microdense sealing member 12 may be configured in various forms to serve as different types of seals with differing functions and properties. For example, such seals can be employed in the perimeter of the door, such as a secondary door seal 122 (see FIG. 5A) and a primary door seal 126 (see FIG. 5B). As another example, a rocker seal 130 (see FIG. 5C) can be used to seal an underbody with a foot well of the vehicle 10 (see FIG. 1). One or more hood seals 134 (see FIG. 5D) may also incorporate microdense seal portions to reduce the weight of the seal to better prevent chatter and/or vibrations from being transmitted across the hood. Further, a pillar margin seal 138 (see FIG. 5E) may be positioned along a pillar of the vehicle 10, and a headlamp seal 142 (see FIG. 5F) may be positioned between a headlamp lens and the vehicle body. A liftgate seal 146 (see FIG. 5G) may be configured to have a microdense seal portion to reduce the weight of the liftgate seal and to be coupled to a back hatch with a flip glass seal 150 (see FIG. 5H) positioned against a liftable rear glass window. As a further example, another pillar margin seal 154 (see FIG. 5I) may be positioned along another pillar of the vehicle 10.

Referring now to FIGS. 5A-5I, a variety of cross-sectional views of the various exemplary versions of the microdense sealing members 12 depicted in FIG. 4 are provided that include: the secondary door seal 122, the primary door seal 126, the rocker seal 130, the hood seal 134, the pillar margin seal 138, the headlamp seal 142, the liftgate seal 146, flip glass seal 150 and pillar margin seal 154. The structures of each of the microdense sealing members 12 may be varied based on the desired application of sealing the respective glass surface to the respective portion of the vehicle 10 (see FIG. 1) and can include various combinations of bodies, legs, lips, flanges, gripping portions, and edges, as previously described in FIG. 4. More particularly, each of these microdense sealing members 12 (e.g., in the exemplary form of seals 122, 126, 130, 134, 138, 142, 146, 150, and 154) generally contain a microdense portion comprising a microdense, foamed silane-crosslinked polyolefin elastomer, along with one or more sponge and/or dense portions comprising sponge and/or dense silane-crosslinked polyolefin elastomer. In some aspects, the microdense sealing member 12 may be extruded around a piece of metal to provide greater structural stability, as shown in secondary door seal 122, headlamp seal 142, and liftgate seal 146. In some aspects, the microdense sealing member 12 may have a flock material coupled to a surface of the member 12. The term "flock", as used herein, is defined to mean a light powder, comprised of ground wood or cotton fiber, used as a coating, extender, and/or filler with the microdense silane-crosslinked polyolefin elastomer to provide a surface having a lower surface energy and/or lower friction surface.

Thus, the disclosure focuses on the composition, method of making the composition, and the corresponding material properties for the microdense silane-crosslinked polyolefin elastomer used to make microdense seals, e.g., microdense sealing members 12. The microdense sealing member 12 is formed from a silane-grafted polyolefin where the silane-grafted polyolefin may have a catalyst added to form a foamed silane-crosslinkable polyolefin elastomer. This foamed silane-crosslinkable polyolefin may then be crosslinked upon exposure to moisture and/or heat to form the final microdense silane-crosslinked polyolefin elastomer or blend. In aspects, the microdense silane-crosslinked polyolefin elastomer or blend includes a first polyolefin having a density less than 0.70 g/cm$^3$, a second polyolefin having a crystallinity of less than 40%, a silane crosslinker, a graft initiator, and a condensation catalyst.

First Polyolefin

The first polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™, an olefin block co-polymer (the Dow Chemical Company) and SEPTON™ V-SERIES, a styrene-ethylene-butylene-styrene block copolymer (Kuraray Co., LTD.). Exemplary ethylene/α-olefin copolymers include those sold under the trade names TAFMER™ (e.g., TAFMER DF710) (Mitsui Chemicals, Inc.), and ENGAGE™ (e.g., ENGAGE 8150) (the Dow Chemical Company). Exemplary propylene/α-olefin copolymers include those sold under the trade name VISTAMAXX 6102 grades (Exxon Mobil Chemical Company), TAFMER™ XM (Mitsui Chemical Company), and Versify (Dow Chemical Company). The EPDM may have a diene content of from about 0.5 to about 10 wt %. The EPM may have an ethylene content of 45 wt % to 75 wt %.

The term "comonomer" refers to olefin comonomers which are suitable for being polymerized with olefin monomers, such as ethylene or propylene monomers. Comonomers may comprise but are not limited to aliphatic $C_2$-$C_{20}$α-olefins. Examples of suitable aliphatic $C_2$-$C_{20}$α-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the comonomer is vinyl acetate. The term "copolymer" refers to a polymer, which is made by linking more than one type of monomer in the same polymer chain. The term "homopolymer" refers to a polymer which is made by linking olefin monomers, in the absence of comonomers. The amount of comonomer can, in some embodiments, be from greater than 0 to about 12 wt % based on the weight of the polyolefin, including from greater than 0 to about 9 wt % and from greater than 0 to about 7 wt %. In some embodiments, the comonomer content is greater than about 2 mol % of the final polymer, including greater than about 3 mol % and greater than about 6 mol %. The comonomer content may be less than or equal to about 30 mol %. A copolymer can be a random or block (heterophasic) copolymer. In some embodiments, the polyolefin is a random copolymer of propylene and ethylene.

In some aspects, the first polyolefin is selected from the group consisting of: an olefin homopolymer, a blend of homopolymers, a copolymer made using two or more olefins, a blend of copolymers each made using two or more olefins, and a combination of olefin homopolymers blended with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based using metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the polyethylene used for the first polyolefin can be classified into several types including, but not limited to, LDPE (Low Density Polyethylene), LLDPE (Linear Low Density Polyethylene), and HDPE (High Density Polyethylene). In other aspects, the polyethylene can be classified as Ultra High Molecular Weight (UHMW), High Molecular Weight (HMW), Medium Molecular Weight (MMW) and Low Molecular Weight (LMW). In still other aspects, the polyethylene may be an ultra-low density ethylene elastomer.

In some aspects, the first polyolefin may include a LDPE/silane copolymer or blend. In other aspects, the first polyolefin may be polyethylene that can be produced using any catalyst known in the art including, but not limited to, chromium catalysts, Ziegler-Natta catalysts, metallocene catalysts or post-metallocene catalysts.

In some aspects, the first polyolefin may have a molecular weight distribution $M_w/M_n$ of less than or equal to about 5, less than or equal to about 4, from about 1 to about 3.5, or from about 1 to about 3.

The first polyolefin may be present in an amount of from greater than 0 to about 100 wt % of the composition. In some embodiments, the amount of polyolefin elastomer is from about 30 to about 70 wt %. In some aspects, the first polyolefin fed to an extruder can include from about 50 wt % to about 80 wt % of an ethylene/α-olefin copolymer, including from about 60 wt % to about 75 wt % and from about 62 wt % to about 72 wt %.

The first polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The first polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some aspects, the first polyolefin has a fractional melt index of from 0.5 g/10 min to about 3,500 g/10 min.

In some aspects, the density of the first polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm$^3$. In other aspects, the density of the first polyolefin may be from about 0.85 g/cm$^3$ to about 0.89 g/cm$^3$, from about 0.85 g/cm$^3$ to about 0.88 g/cm$^3$, from about 0.84 g/cm$^3$ to about 0.88 g/cm$^3$, or from about 0.83 g/cm$^3$ to about 0.87 g/cm$^3$. In still other aspects, the density is at about 0.84 g/cm$^3$, about 0.85 g/cm$^3$, about 0.86 g/cm$^3$, about 0.87 g/cm$^3$, about 0.88 g/cm$^3$, or about 0.89 g/cm$^3$.

The percent crystallinity of the first polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

Second Polyolefin

The second polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™ (the Dow Chemical Company) and SEPTON™ V-SERIES (Kuraray Co., LTD.). Exemplary ethylene/α-olefin copolymers include those sold under the trade names TAFMER™ (e.g., TAFMER DF710) (Mitsui Chemicals, Inc.) and ENGAGE™ (e.g., ENGAGE 8150) (the Dow Chemical Company). Exemplary propylene/α-olefin copolymers include those sold under the trade name TAFMER™ XM grades (Mitsui Chemical Company) and VISTAMAXX™ (e.g., VISTAMAXX 6102) (Exxon Mobil Chemical Company). The EPDM may have a diene content of from about 0.5 to about 10 wt %. The EPM may have an ethylene content of 45 wt % to 75 wt %.

In some aspects, the second polyolefin is selected from the group consisting of: an olefin homopolymer, a blend of homopolymers, a copolymer made using two or more olefins, a blend of copolymers each made using two or more olefins, and a blend of olefin homopolymers with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based using metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the second polyolefin may include a polypropylene homopolymer, a polypropylene copolymer, a polyethylene-co-propylene copolymer, or a mixture thereof. Suitable polypropylenes include but are not limited to polypropylene obtained by homopolymerization of propylene or copolymerization of propylene and an alpha-olefin comonomer. In some aspects, the second polyolefin may have a higher molecular weight and/or a higher density than the first polyolefin.

In some embodiments, the second polyolefin may have a molecular weight distribution $M_w/M_n$ of less than or equal to about 5, less than or equal to about 4, from about 1 to about 3.5, or from about 1 to about 3.

The second polyolefin may be present in an amount of from greater than 0 wt % to about 100 wt % of the composition. In some embodiments, the amount of polyolefin elastomer is from about 30 wt % to about 70 wt %. In some embodiments, the second polyolefin fed to the extruder can include from about 10 wt % to about 50 wt % polypropylene, from about 20 wt % to about 40 wt % polypropylene, or from about 25 wt % to about 35 wt % polypropylene. The polypropylene may be a homopolymer or a copolymer.

The second polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The second polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some embodiments, the polyolefin has a fractional melt index of from 0.5 g/10 min to about 3,500 g/10 min.

In some aspects, the density of the second polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm$^3$. In other aspects, the density of the first polyolefin may be from about 0.85 g/cm$^3$ to about 0.89 g/cm$^3$, from about 0.85 g/cm$^3$ to about 0.88 g/cm$^3$, from about 0.84 g/cm$^3$ to about 0.88 g/cm$^3$, or from about 0.83 g/cm$^3$ to about 0.87 g/cm$^3$. In still other aspects, the density is at about 0.84 g/cm$^3$, about 0.85 g/cm$^3$, about 0.86 g/cm$^3$, about 0.87 g/cm$^3$, about 0.88 g/cm$^3$, or about 0.89 g/cm$^3$.

The percent crystallinity of the second polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

As noted, the silane-crosslinked polyolefin elastomer or blend, e.g., as employed in microdense sealing members 12 (see FIGS. 1-4), includes both the first polyolefin and the second polyolefin. The second polyolefin is generally used to modify the hardness and/or processability of the first polyolefin having a density less than 0.90 g/cm$^3$. In some aspects, more than just the first and second polyolefins may be used to form the silane-crosslinked polyolefin elastomer or blend. For example, in some aspects, one, two, three, four, or more different polyolefins having a density less than 0.90 g/cm$^3$, less than 0.89 g/cm$^3$, less than 0.88 g/cm$^3$, less than 0.87 g/cm$^3$, less than 0.86 g/cm$^3$, or less than 0.85 g/cm$^3$ may be substituted and/or used for the first polyolefin. In some aspects, one, two, three, four, or more different polyolefins, polyethylene-co-propylene copolymers may be substituted and/or used for the second polyolefin.

The blend of the first polyolefin having a density less than 0.90 g/cm$^3$ and the second polyolefin having a crystallinity less than 40% is used because the subsequent silane grafting and crosslinking of these first and second polyolefin materials together are what form the core resin structure in the final silane-crosslinked polyolefin elastomer. Although additional polyolefins may be added to the blend of the silane-grafted, silane-crosslinkable, and/or silane-crosslinked polyolefin elastomer as fillers to improve and/or modify the Young's modulus as desired for the final product, any polyolefins added to the blend having a crystallinity equal to or greater than 40% are not chemically or covalently incorporated into the crosslinked structure of the final silane-crosslinked polyolefin elastomer.

In some aspects, the first and second polyolefins may further include one or more TPVs and/or EPDM with or without silane graft moieties where the TPV and/or EPDM polymers are present in an amount of up to 20 wt % of the silane-crosslinked polyolefin elastomer/blend.

Grafting Initiator

A grafting initiator (also referred to as "a radical initiator" in the disclosure) can be utilized in the grafting process of at least the first and second polyolefins by reacting with the respective polyolefins to form a reactive species that can react and/or couple with the silane crosslinker molecule. The grafting initiator can include halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy) hexyne-3,1,3-bis(t-butyl-peroxy-isopropyl)benzene, n-butyl-4,4-bis(t-butyl-peroxy)valerate, benzoyl peroxide, t-butylperoxybenzoate, t-butylperoxy isopropyl carbonate, and t-butylperbenzoate, as well as bis(2-methylbenzoyl)peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylpexoxy)-1,4-diisopropylbenzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (available from Arkema, Inc.).

In some aspects, the grafting initiator is present in an amount of from greater than 0 wt % to about 2 wt % of the composition, including from about 0.15 wt % to about 1.2 wt % of the composition. The amount of initiator and silane employed may affect the final structure of the silane grafted polymer (e.g., the degree of grafting in the grafted polymer and the degree of crosslinking in the cured polymer). In some aspects, the reactive composition contains at least 100 ppm of initiator, or at least 300 ppm of initiator. The initiator may be present in an amount from 300 ppm to 1500 ppm, or from 300 ppm to 2000 ppm. The silane:initiator weight ratio may be from about 20:1 to 400:1, including from about 30:1 to about 400:1, from about 48:1 to about 350:1, and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in a melt, in solution, in a solid-state, and/or in a swollen-state. The silanation may be performed in a wide-variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature (i.e., the temperature at which the polymer starts melting and starts to flow) may be from about 120° C. to about 260° C., including from about 130° C. to about 250° C.

Silane Crosslinker

A silane crosslinker can be used to covalently graft silane moieties onto the first and second polyolefins and the silane crosslinker may include alkoxysilanes, silazanes, siloxanes, or a combination thereof. The grafting and/or coupling of the various potential silane crosslinkers or silane crosslinker molecules is facilitated by the reactive species formed by the grafting initiator reacting with the respective silane crosslinker.

In some aspects, the silane crosslinker is a silazane where the silazane may include, for example, hexamethyldisilazane (HMDS) or Bis(trimethylsilyl)amine. In some aspects, the silane crosslinker is a siloxane where the siloxane may include, for example, polydimethylsiloxane (PDMS) and octamethylcyclotetrasiloxane.

In some aspects, the silane crosslinker is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —$NH_2$, —$NHCH_3$ or —$N(CH_3)_2$; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl trimethoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine; N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycysil)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl) undecanol; triethoxysilyl undecanol; ethylene glycol acetal; and N-(3-ethoxysilylpropyl)gluconamide.

In some aspects, the alkylsilane may be expressed with a general formula: $R_nSi(OR')_{4-n}$ wherein: n is 1, 2 or 3; R is a $C_{1-20}$ alkyl or a $C_{2-20}$ alkenyl; and R' is an $C_{1-20}$ alkyl. The term "alkyl" by itself or as part of another substituent, refers to a straight, branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, $C_{1-6}$ alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers. The term "$C_{2-20}$alkenyl" by itself or as part of another substituent, refers to an unsaturated hydrocarbyl group, which may be linear, or branched, comprising one or more carbon-carbon double bonds having 2 to 20 carbon atoms. Examples of $C_{2-6}$ alkenyl groups are ethenyl, 2-propenyl, 2-butenyl, 3-butenyl, 2-pentenyl and its isomers, 2-hexenyl and its isomers, 2,4-pentadienyl and the like.

In some aspects, the alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, and a combination thereof.

In some aspects, the alkylsilane compound may be selected from triethoxyoctylsilane, trimethoxyoctylsilane, and a combination thereof.

Additional examples of silanes that can be used as silane crosslinkers include, but are not limited to, those of the general formula $CH_2=CR-(COO)_x(C_nH_{2n})_y$ $SiR'_3$, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some aspects, no more than one of the three R' groups is an alkyl. In other aspects, not more than two of the three R' groups is an alkyl.

Any silane or mixture of silanes known in the art that can effectively graft to and crosslink an olefin polymer can be used in the practice of the present disclosure. In some aspects, the silane crosslinker can include, but is not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups. In other aspects, the silane crosslinkers are unsaturated alkoxy silanes which can be grafted onto the polymer. In still other aspects, additional exemplary silane crosslinkers include vinyltrimethoxysilane, vinyltriethoxysilane, 3-(trimethoxysilyl)propyl methacrylate gamma-(meth)acryloxypropyl trimethoxysilane), and mixtures thereof.

The silane crosslinker may be present in the silane-grafted polyolefin elastomer in an amount of from greater than 0 wt % to about 10 wt %, including from about 0.5 wt % to about 5 wt %. The amount of silane crosslinker may be varied based on the nature of the olefin polymer, the silane itself, the processing conditions, the grafting efficiency, the application, and other factors. The amount of silane crosslinker may be at least 2 wt %, including at least 4 wt % or at least 5 wt %, based on the weight of the reactive composition. In other aspects, the amount of silane crosslinker may be at least 10 wt %, based on the weight of the reactive composition. In still other aspects, the silane crosslinker content is at least 1% based on the weight of the reactive composition. In some embodiments, the silane crosslinker fed to the extruder may include from about 0.5 wt % to about 10 wt % of silane monomer, from about 1 wt % to about 5 wt % silane monomer, or from about 2 wt % to about 4 wt % silane monomer.

Condensation Catalyst

A condensation catalyst can facilitate both the hydrolysis and subsequent condensation of the silane grafts on the silane-grafted polyolefin elastomer to form crosslinks. In some aspects, the crosslinking can be aided by the use of an electron beam radiation. In some aspects, the condensation catalyst can include, for example, organic bases, carboxylic acids, and organometallic compounds (e.g., organic titanates and complexes or carboxylates of lead, cobalt, iron, nickel, zinc, and tin). In other aspects, the condensation catalyst can include fatty acids and metal complex compounds such as metal carboxylates; aluminum triacetyl acetonate, iron triacetyl acetonate, manganese tetraacetyl acetonate, nickel tetraacetyl acetonate, chromium hexaacetyl acetonate, titanium tetraacetyl acetonate and cobalt tetraacetyl acetonate; metal alkoxides such as aluminum ethoxide, aluminum propoxide, aluminum butoxide, titanium ethoxide, titanium propoxide and titanium butoxide; metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate); acidic compounds such as formic acid, acetic acid, propionic acid, p-toluenesulfonic acid, trichloroacetic acid, phosphoric acid, monoalkylphosphoric acid, dialkylphosphoric acid, phosphate ester of p-hydroxyethyl (meth)acrylate, monoalkylphosphorous acid and dialkylphosphorous acid; acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts or polyvalent metal salts of these acids, sodium hydroxide, lithium chloride; organometal compounds such as diethyl zinc and tetra(n-butoxy)titanium; and amines such as dicyclohexylamine, triethylamine, N,N-dimethylbenzylamine, N,N,N',N'-tetramethyl-1,3-butanediamine, diethanolamine, triethanolamine and cyclohexylethylamine. In still other aspects, the condensation catalyst can include ibutyltindilaurate, dioctyltinmaleate, dibutyltindiacetate, dibutyltindioctoate, stannous acetate, stannous octoate, lead naphthenate, zinc caprylate, and cobalt naphthenate. Depending on the desired final material properties of the silane-crosslinked polyolefin elastomer or blend, a single condensation catalyst or a mixture of condensation catalysts may be utilized. The condensation catalyst(s) may be present in an amount of from about 0.01 wt % to about 1.0 wt 5, including from about 0.25 wt % to about 8 wt %, based on the total weight of the silane-grafted polyolefin elastomer/blend composition.

In some aspects, a crosslinking system can include and use one or all of a combination of radiation, heat, moisture, and additional condensation catalyst. In some aspects, the condensation catalyst may be present in an amount of from 0.25 wt % to 8 wt %. In other aspects, the condensation catalyst may be included in an amount of from about 1 wt % to about 10 wt %, or from about 2 wt % to about 5 wt %.

Blowing Agent

The foaming agent can be a chemical foaming agent (e.g., organic or inorganic foaming agent) and/or a physical foaming (e.g., gases and volatile low weight molecules) that is added to the silane-grafted polyolefin elastomer and condensation catalyst blend during the extrusion and/or molding process to produce the foamed silane-crosslinked polyolefin elastomer.

In some aspects, the foaming agent may a physical foaming agent including a microencapsulated foaming agent, otherwise referred to in the art as a microencapsulated blowing agent (MEBA). MEBAs include a family of physical foaming agents that are defined as a thermo expandable microsphere which is formed by the encapsulation of a volatile hydrocarbon into an acrylic copolymer shell. When the acrylic copolymer shell expands, the volatile hydrocarbon (e.g., butane) creates a foam in the silane-crosslinkable polyolefin elastomer and reduces its weight. In some aspects, the MEBAs have an average particle size of from about 20 μm to about 30 μm. Exemplary MEBAs include those sold under the trade name MATSUMOTO F-AC170D. In some aspects, MEBA's may be used in combination with other foaming agents including organic and inorganic foaming agents.

Organic foaming agents that may be used can include, for example, azo compounds, such as azodicarbonamide (ADCA), barium azodicarboxylate, azobisisobutyronitrile (AIBN), azocyclohexylnitrile, and azodiaminobenzene, N-nitroso compounds, such as N,N'-dinitrosopentamethylenetetramine (DPT), N,N'-dimethyl-N,N'-dinitrosoterephthalamide, and trinitrosotrimethyltriamine, hydrazide compounds, such as 4,4'-oxybis(benzenesulfonylhydrazide) (OBSH), paratoluene sulfonylhydrazide, diphenylsulfone-3, 3'-disulfonylhydrazide, 2,4-toluenedisulfonylhydrazide, p,p-bis(benzenesulfonylhydrazide)ether, benzene-1,3-disulfonylhydrazide, and allylbis(sulfonylhydrazide), semicarbazide compounds, such as p-toluilenesulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole, and other known organic foaming agents. Preferably, azo compounds and N-nitroso compounds are used. Further preferably, azodicarbonamide (ADCA) and N,N'-dinitrosopentamethylenetetramine (DPT) are used. The organic foaming agents listed above may be used alone or in any combination of two or more.

The decomposition temperature and amount of organic foaming agent used can have important consequences on the density and material properties of the foamed silane-crosslinker polyolefin elastomer. In some aspects, the organic foaming agent has a decomposition temperature of from about 150° C. to about 210° C. The organic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend. If the organic foaming agent has a decomposition temperature lower than 150° C., early foaming may occur during compounding. Meanwhile, if the organic foaming agent has a decomposition temperature higher than 210° C., it may take longer, e.g., greater than 15 minutes, to mold the foam, resulting in low productivity. Additional foaming agents may include any compound whose decomposition temperature is within the range defined above.

The inorganic foaming agents that may be used include, for example, hydrogen carbonate, such as sodium hydrogen carbonate, and ammonium hydrogen carbonate, carbonate, such as sodium carbonate, and ammonium carbonate, nitrite, such as sodium nitrite, and ammonium nitrite, borohydride, such as sodium borohydride, and other known inorganic foaming agents, such as azides. In some aspect, hydrogen carbonate may be used. In other aspects, sodium hydrogen carbonate may be used. The inorganic foaming agents listed above may be used alone or in any combination of two or more. The inorganic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend.

Physical blowing agents that may be used include, for example, supercritical carbon dioxide, supercritical nitrogen, butane, pentane, isopentane, cyclopentane. The physical foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based the total weight of the polymer blend.

Optional Additional Components

The silane-crosslinked polyolefin elastomer may optionally include one or more fillers. The filler(s) may be extruded with the silane-grafted polyolefin and in some aspects may include additional polyolefins having a crystallinity greater than 20%, greater than 30%, greater than 40%, or greater than 50%. In some aspects, the filler(s) may include metal oxides, metal hydroxides, metal carbonates, metal sulfates, metal silicates, clays, talcs, carbon black, and silicas. Depending on the application and/or desired properties, these materials may be fumed or calcined.

With further regard to the filler(s), the metal of the metal oxide, metal hydroxide, metal carbonate, metal sulfate, or metal silicate may be selected from alkali metals (e.g., lithium, sodium, potassium, rubidium, caesium, and francium); alkaline earth metals (e.g., beryllium, magnesium, calcium, strontium, barium, and radium); transition metals (e.g., zinc, molybdenum, cadmium, scandium, titanium, vanadium, chromium, manganese, iron, cobalt, nickel, copper, yttrium, zirconium, niobium, technetium, ruthernium, rhodium, palladium, silver, hafnium, taltalum, tungsten, rhenium, osmium, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, neptunium, plutonium, americium, curium, berkelium, californium, einsteinium, fermium, mendelevium, nobelium, and lawrencium); germanium; arsenic; antimony; and astatine.

The filler(s) of the silane-crosslinked polyolefin elastomer or blend may be present in an amount of from greater than 0 wt % to about 50 wt %, including from about 1 wt % to about 20 wt % and from about 3 wt % to about 10 wt %.

The silane-crosslinked polyolefin elastomer and/or the respective articles formed (e.g., microdense sealing members 12) may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes). In some embodiments, the wax(es) are present in an amount of from about 0 wt % to about 10 wt %.

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included in the silane-crosslinked polyolefin elastomer/blend. The tackifying resins may have a ring and ball softening point in the range of from 70° C. to about 150° C. and a viscosity of less than about 3,000 cP at 177° C. In some aspects, the tackifying resin(s) are present in an amount of from about 0 wt % to about 10 wt %.

In some aspects, the silane-crosslinked polyolefin elastomer may include one or more oils. Non-limiting types of oils include white mineral oils and naphthenic oils. In some embodiments, the oil(s) are present in an amount of from about 0 wt % to about 10 wt %.

In some aspects, the silane-crosslinked polyolefin elastomer may include one or more filler polyolefins having a crystallinity greater than 20%, greater than 30%, greater than 40%, or greater than 50%. The filler polyolefin may include polypropylene, poly(ethylene-co-propylene), and/or other ethylene/α-olefin copolymers. In some aspects, the use of the filler polyolefin may be present in an amount of from about 5 wt % to about 60 wt %, from about 10 wt % to about 50 wt %, from about 20 wt % to about 40 wt %, or from about 5 wt % to about 20 wt %. The addition of the filler polyolefin may increase the Young's modulus by at least 10%, by at least 25%, or by at least 50% for the final silane-crosslinked polyolefin elastomer.

In some aspects, the silane-crosslinked polyolefin elastomer of the present disclosure may include one or more stabilizers (e.g., antioxidants). The silane-crosslinked polyolefin elastomer may be treated before grafting, after grafting, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 wt %, including less than 0.2 wt % of the composition.

Method for Making the Silane-Grafted Polyolefin Elastomer

The synthesis/production of the microdense silane-crosslinked polyolefin elastomer may be performed by combining the respective components in one extruder using a single-step Monosil process or in two extruders using a two-step Sioplas process which eliminates the need for additional steps of mixing and shipping rubber compounds prior to extrusion.

Figure 6:
FIG. 6 is a schematic reaction pathway used to produce a silane-crosslinked polyolefin elastomer according to some aspects of the present disclosure.
Figure 6:
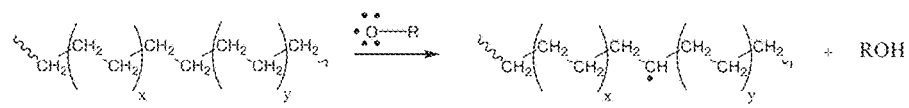
Figure 6:
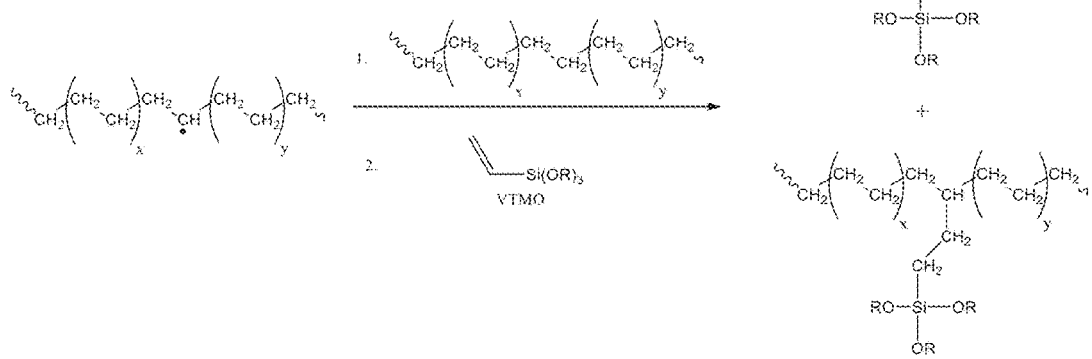
Figure 6:
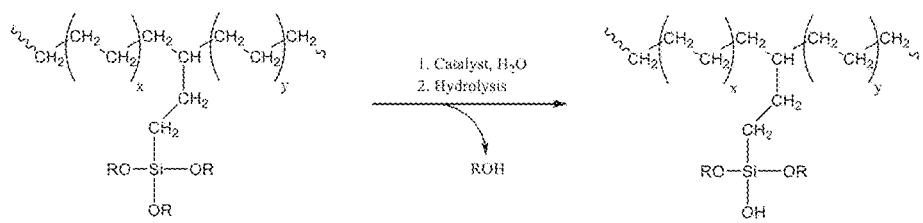
Figure 6:
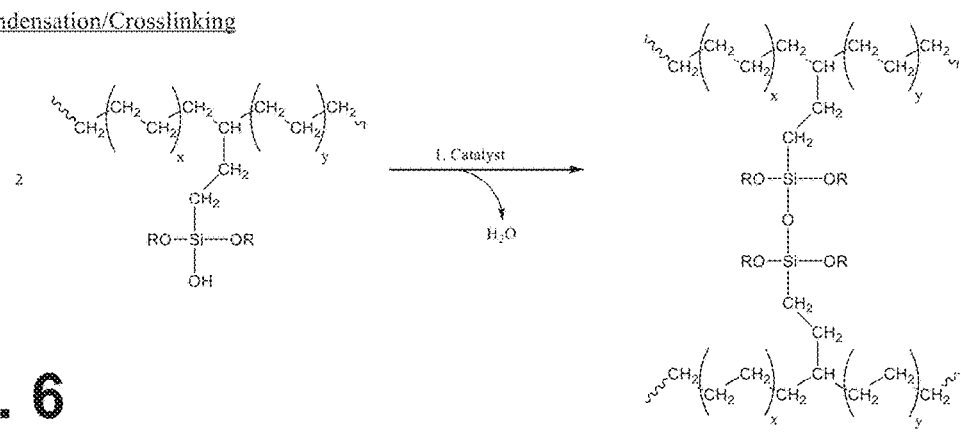

Referring now to FIG. 6, the general chemical process used during both the single-step Monosil process and two-step Sioplas process used to synthesize the microdense silane-crosslinked polyolefin elastomer is provided. The process starts with a grafting step that includes initiation from a grafting initiator followed by propagation and chain transfer with the first and second polyolefins. The grafting initiator, in some aspects a peroxide or azo compound, homolytically cleaves to form two radical initiator fragments that transfer to one of the first and second polyolefins chains through a propagation step. The free radical, now positioned on the first or second polyolefin chain, can then transfer to a silane molecule and/or another polyolefin chain. Once the initiator and free radicals are consumed, the silane grafting reaction for the first and second polyolefins is complete.

Still referring to FIG. 6, once the silane grafting reaction is complete, a mixture of stable first and second silane-grafted polyolefins is produced. A crosslinking catalyst may then be added to the first and second silane-grafted polyolefins to form the silane-grafted polyolefin elastomer. The crosslinking catalyst may first facilitate the hydrolysis of the silyl group grafted onto the polyolefin backbones to form reactive silanol groups. The silanol groups may then react with other silanol groups on other polyolefin molecules to form a crosslinked network of elastomeric polyolefin polymer chains linked together through siloxane linkages. The density of silane crosslinks throughout the silane-grafted polyolefin elastomer can influence the material properties exhibited by the elastomer.

Figure 7:
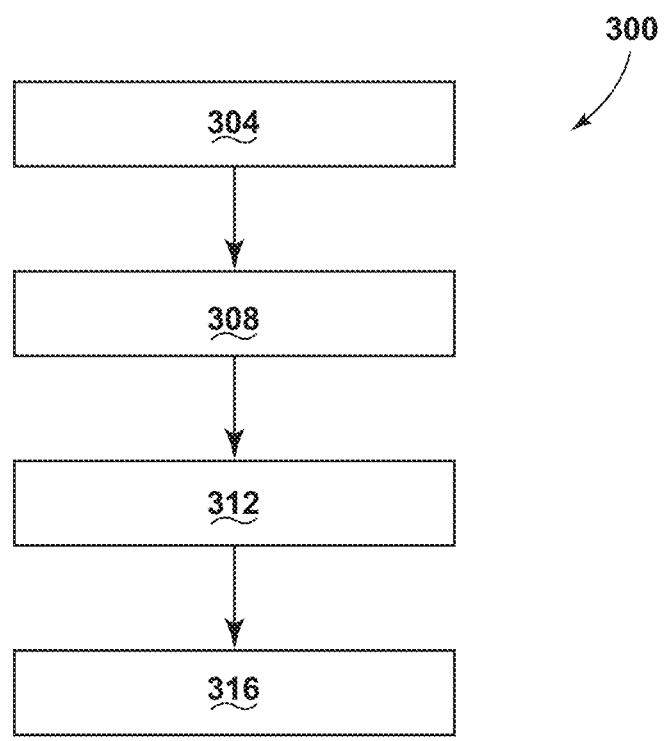
FIG. 7 is a flow diagram of a method for making a microdense seal with a silane-crosslinked polyolefin elastomer using a two-step Sioplas approach according to some aspects of the present disclosure.

Referring now to FIGS. 7 and 8A, a method 300 for making a microdense seal, such as the microdense sealing member 12, using the two-step Sioplas process is shown. The method 300 may begin with a step 304 that includes extruding (e.g., with a twin screw extruder 182) the first polyolefin 170 having a density less than 0.86 g/cm$^3$, the second polyolefin 174, and a silan cocktail 178 including the silane crosslinker (e.g., vinyltrimethoxy silane, VTMO) and the grafting initiator (e.g. dicumyl peroxide) together to form a silane-grafted polyolefin blend. The first polyolefin 170 and second polyolefin 174 may be added to a reactive twin screw extruder 182 using an addition hopper 186. The silan cocktail 178 may be added to the twin screws 190 further down the extrusion line to help promote better mixing with the first and second polyolefin 170, 174 blend. A forced volatile organic compound (VOC) vacuum 194 may be used on the reactive twin screw extruder 182 to help maintain a desired reaction pressure. The twin screw extruder 182 is considered reactive because the radical initiator and silane crosslinker are reacting with and forming new covalent bonds with both the first and second polyolefins 170, 174. The melted silane-grafted polyolefin blend can exit the reactive twin screw extruder 182 using a gear pump 198 that injects the molten silane-grafted polyolefin blend into a water pelletizer 202 that can form a pelletized silane-grafted polyolefin blend 206. In some aspects, the molten silane-grafted polyolefin blend may be extruded into pellets, pillows, or any other configuration prior to the incorporation of the condensation catalyst 210 (see FIG. 8B) and formation of the final article.

The reactive twin screw extruder 182 can be configured to have a plurality of different temperature zones (e.g., Z0-Z12 as shown in FIG. 8A) that extend for various lengths of the twin screw extruder 182. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7-Z12 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Referring now to FIGS. 7 and 8B, the method 300 next includes a step 308 of extruding the silane-grafted polyolefin blend 206, the condensation catalyst 210, and the foaming agent 214 together to form a foamed silane-crosslinkable polyolefin blend 212. In some aspects, one or more optional additives may be added with the silane-grafted polyolefin blend 206 and the condensation catalyst 210 to adjust the final material properties of the silane-crosslinked polyolefin olefin blend. In step 308, the silane-grafted polyolefin blend 206 is mixed with a silanol forming condensation catalyst 210 to form reactive silanol groups on the silane grafts that can subsequently crosslink when exposed to humidity and/or heat. In some aspects, the condensation catalyst can include a mixture of sulfonic acid, antioxidant, process aide, and carbon black for coloring where the ambient moisture is sufficient for this condensation catalyst to crosslink the foamed silane-crosslinkable polyolefin blend over a longer time period (e.g., about 48 hours). The silane-grafted polyolefin blend 206 and the condensation catalyst 210 may be added to a reactive single screw extruder 218 using an addition hopper (e.g., as comparable to the addition hopper 186 shown in FIG. 8A) and an addition gear pump 226. The combination of the silane-grafted polyolefin blend 206 and the condensation catalyst 210, and in some aspects one or more optional additives 214, may be added to a single screw 222 of the reactive single screw extruder 218. The single screw extruder 218 is considered reactive because crosslinking can begin as soon as the silane-grafted polyolefin blend 206 and the condensation catalyst 210 are melted and combined together to mix the condensation catalyst 210 thoroughly and evenly throughout the melted silane-grafted polyolefin blend 206. The melted foamed silane-crosslinkable polyolefin blend 212 can exit the reactive single screw extruder 218 through a die that can inject the molten foamed silane-crosslinkable polyolefin blend into the form of an uncured microdense sealing element.

During step 308, as the silane-grafted polyolefin blend 206 is extruded together with the condensation catalyst 210 to form the foamed silane-crosslinkable polyolefin blend 212, a certain amount of crosslinking may occur. In some aspects, the foamed silane-crosslinkable polyolefin blend 212 may be about 25% cured, about 30% cured, about 35% cured, about 40% cured, about 45% cured, about 50% cured, about 55% cured, about 60% cured, about 65% cured, or about 70% cured where gel test (ASTM D2765) can be used to determine the amount of crosslinking in the final microdense silane-crosslinked polyolefin elastomer.

Still referring to FIGS. 7 and 8B, the method 300 further includes a step 312 of molding the foamed silane-crosslinkable polyolefin blend 212 into the form of an uncured microdense sealing element. The single screw extruder 218 melts and extrudes the foamed silane-crosslinkable polyolefin through a die that can inject the molten foamed silane-crosslinkable polyolefin blend 212 into the uncured microdense sealing element, for example, uncured or partially cured versions microdense sealing members 12, such as the hood seal 134, and exemplary microdense sealing member 136 (see also FIG. 3), each of which contains microdense portions.

Referring again to FIG. 7, the method 300 can further include a step 316 of crosslinking the foamed silane-crosslinkable polyolefin blend 212 or the microdense sealing member 12 in an uncured form at an ambient temperature and/or an ambient humidity to form the microdense sealing member 12 (see FIGS. 1 and 2) having a density from about 0.50 g/cm$^3$ to about 0.59 g/cm$^3$. More particularly, in this crosslinking process, the water hydrolyzes the silane of the foamed silane-crosslinkable polyolefin elastomer to produce a silanol. The silanol groups on various silane grafts can then be condensed to form intermolecular, irreversible Si—O—Si crosslink sites. The amount of crosslinked silane groups, and thus the final polymer properties, can be regulated by controlling the production process, including the amount of catalyst used.

The crosslinking/curing of step 316 of the method 300 may occur over a time period of from greater than 0 to about 20 hours. In some aspects, curing takes place over a time period of from about 1 hour to about 20 hours, 10 hours to about 20 hours, from about 15 hours to about 20 hours, from about 5 hours to about 15 hours, from about 1 hour to about 8 hours, or from about 3 hours to about 6 hours. The temperature during the crosslinking/curing may be about room temperature, from about 20° C. to about 25° C., from about 20° C. to about 150° C., from about 25° C. to about 100° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long LID, 30 to 1, at an extruder heat setting close to TPV processing conditions wherein the extrudate crosslinks at ambient conditions becoming a thermoset in properties. In other aspects, this process may be accelerated by steam exposure. Immediately after extrusion, the gel content (also called the crosslink density) may be about 60%, but after 96 hrs at ambient conditions, the gel content may reach greater than about 95%.

In some aspects, one or more reactive single screw extruders 218 may be used to form the uncured sealing element and corresponding microdense sealing member that have one or more types of silane-crosslinked polyolefin elastomers. For example, in some aspects, one reactive single screw extruder 218 may be used to produce and extrude the microdense silane-crosslinked polyolefin elastomer while a second reactive single screw extruder 218 may be used to produce and extrude the dense or microdense silane-crosslinked polyolefin elastomer. The complexity and architecture of the final microdense sealing member 12 will determine the number and types of reactive single screw extruder 218.

It is understood that the description outlining and teaching the various microdense sealing members 12, and their respective components and compositions, can be used in any combination, and applies equally well to the method 300 for making the microdense sealing member using the two-step Sioplas process as shown in FIGS. 7-8B.

Figure 9:
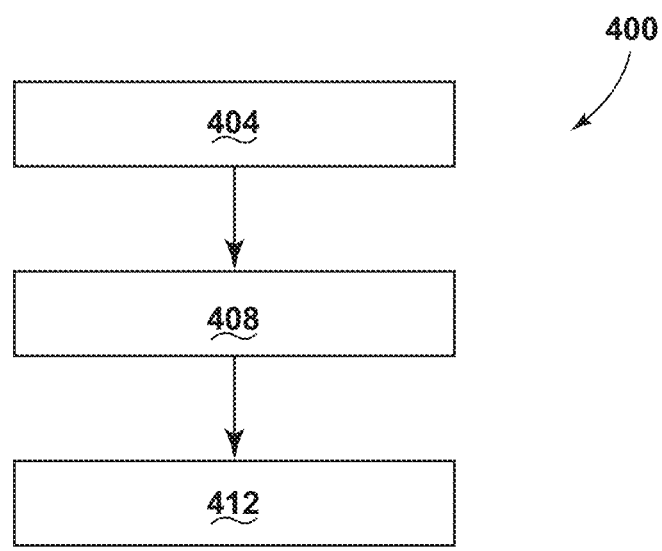
FIG. 9 is a flow diagram of a method for making a microdense seal with a silane-crosslinked polyolefin elastomer using a one-step Monosil approach according to some aspects of the present disclosure.
Figure 10:
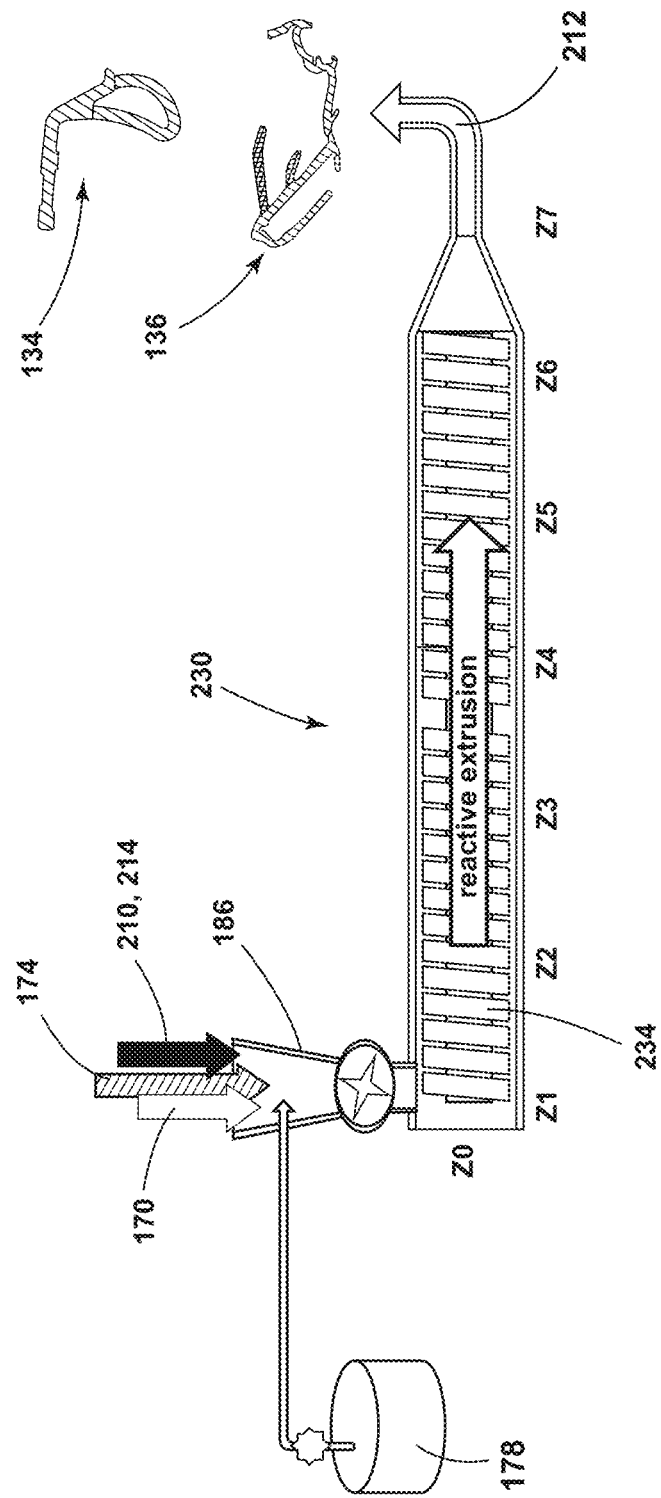
FIG. 10 is a schematic cross-sectional view a reactive single-screw extruder according to some aspects of the present disclosure.

Referring now to FIGS. 9 and 10, a method 400 for making a microdense seal, such as microdense sealing member 12, using the one-step Monosil process is shown. The method 400 may begin with a step 404 that includes extruding (e.g., with a single screw extruder 230) the first polyolefin 170 having a density less than 0.86 g/cm$^3$, the second polyolefin 174, the silan cocktail 178 including the silane crosslinker (e.g., vinyltrimethoxy silane, VTMO) and grafting initiator (e.g. dicumyl peroxide), and the condensation catalyst 210 together to form the crosslinkable silane-grafted polyolefin blend. The first polyolefin 170, second polyolefin 174, and silan cocktail 178 may be added to the reactive single screw extruder 230 using an addition hopper 186. In some aspects, the silan cocktail 178 may be added to a single screw 234 further down the extrusion line to help promote better mixing with the first and second polyolefin 170, 174 blend. In some aspects, one or more optional additives 214 may be added with the first polyolefin 170, second polyolefin 174, and silan cocktail 178 to tweak the final material properties of the foamed silane-crosslinkable polyolefin blend 212. The single screw extruder 182 is considered reactive because the radical initiator and silane crosslinker of the silan cocktail 178 are reacting with and forming new covalent bonds with both the first and second polyolefin blends 170, 174. In addition, the reactive single screw extruder 230 mixes the condensation catalyst 210 in together with the melted silane-grafted polyolefin blend. The melted foamed silane-crosslinkable polyolefin blend 212 can exit the reactive single screw extruder 230 using a gear pump (not shown) and/or die that can eject the molten foamed silane-crosslinkable polyolefin blend into the uncured microdense sealing element.

During step 404, as the first polyolefin 170, second polyolefin 174, silan cocktail 178, and condensation catalyst 210 are extruded together, a certain amount of crosslinking may occur in the reactive single screw extruder 230 (see FIGS. 9 and 10). In some aspects, the foamed silane-crosslinkable polyolefin blend 212 may be about 25% cured, about 30% cured, about 35% cured, about 40% cured, about 45% cured, about 50% cured, about 55% cured, about 60% cured, bout 65% cured, or about 70% as it leaves the reactive single screw extruder 230. The gel test (ASTM D2765) can be used to determine the amount of crosslinking in the final microdense silane-crosslinked polyolefin elastomer.

The reactive single screw extruder 230 can be configured to have a plurality of different temperature zones (e.g., Z0-Z7 as shown in FIG. 10) that extend for various lengths along the extruder. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Still referring to FIGS. 9 and 10, the method 400 further includes a step 408 of molding the foamed silane-crosslinkable polyolefin blend into the uncured microdense sealing element. The reactive single screw extruder 230 can melt and extrude the foamed silane-crosslinkable polyolefin through the die that can eject the molten foamed silane-crosslinkable polyolefin blend into the uncured microdense sealing element to then be cured into the microdense sealing member 12 (see FIGS. 1 and 2), for example, the microdense hood seal 134, and exemplary microdense sealing member 136 (see also FIG. 3), each of which includes microdense portions.

Still referring to FIGS. 9 and 10, the method 400 can further include a step 412 of crosslinking the foamed silane-crosslinkable polyolefin blend 212 of the uncured microdense sealing element at an ambient temperature and an ambient humidity to form the element into the microdense-containing seal, such as microdense sealing member 12 having a density from about 0.50 g/cm$^3$ to about 0.59 g/cm$^3$. The amount of crosslinked silane groups, and thus the final polymer properties, can be regulated by controlling the production process, including the amount of catalyst used.

The step 412 of crosslinking the foamed silane-crosslinkable polyolefin blend may occur over a time period of from greater than 0 to about 20 hours. In some aspects, curing takes place over a time period of from about 1 hour to about 20 hours, 10 hours to about 20 hours, from about 15 hours to about 20 hours, from about 5 hours to about 15 hours, from about 1 hour to about 8 hours, or from about 3 hours to about 6 hours. The temperature during the crosslinking and curing may be about room temperature, from about 20° C. to about 25° C., from about 20° C. to about 150° C., from about 25° C. to about 100° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long LID, 30 to 1, at an extruder heat setting close to TPV processing conditions wherein the extrudate crosslinks at ambient conditions becoming a thermoset in properties. In other aspects, this process may be accelerated by steam exposure. Immediately after extrusion, the gel content (also called the crosslink density) may be about 60%, but after 96 hrs at ambient conditions, the gel content may reach greater than about 95%.

In some aspects, one or more reactive single screw extruders 230 (see FIG. 10) may be used to form the uncured sealing element and corresponding microdense sealing member that have one or more types of silane-crosslinked polyolefin elastomers. For example, in some aspects, one reactive single screw extruder 230 may be used to produce and extrude the microdense silane-crosslinked polyolefin elastomer while a second reactive single screw extruder 230 may be used to produce and extrude the static or dynamic (also referred to as a "sponge") silane-crosslinked polyolefin elastomer. The complexity and architecture of the final microdense sealing member 12 will determine the number and types of reactive single screw extruders 230 employed in the method depicted in FIGS. 9 and 10.

It is understood that the description outlining and teaching the various microdense sealing members 12, and their respective components and compositions, can be used in any combination, and applies equally well to the method 400 for making the microdense sealing member using the one-step Monosil process as shown in FIGS. 9 and 10.

Non-limiting examples of articles that can employ the microdense silane-crosslinked polyolefin elastomer of the disclosure include: microdense seals such as weather seals (e.g., glass run channels including molded details/corners), sunroof seals, convertible top seals, mirror seals, body-panel interface seals, stationary window moldings, glass encapsulations, cut-line seals, greenhouse moldings, occupation detector system sensor switches, rocker seals, outer and inner belts, auxiliary and margin seals, edge protector/gimp seals, and below-belt brackets and channels; automotive hoses such as coolant hoses, air conditioning hoses, and vacuum hoses; anti-vibration system (AVS) components such as mounts (e.g., engine, body, accessory, component), dampers, bushings, strut mounts, and isolators; coatings such as coatings for brake lines, fuel lines, transmission oil cooler lines, brackets, cross members, frame components, body panels and components, suspension components, wheels, hubs, springs, and fasteners; air deflectors, spoilers, fascia, and trim; building, window, and door seals; boots, bellows, and grommets; gaskets (e.g., pneumatic and/or hydraulic gaskets); wire and cable sheathing; tires; windshield wipers and squeegees; floor mats; pedal covers; automotive belts; conveyor belts; shoe components; marine bumpers; O-rings; valves and seals; and springs (e.g., as substitutes for mechanical metal springs).

Microdense Silane-Crosslinked Polyolefin Elastomer Physical Properties

A "thermoplastic", as used herein, is defined to mean a polymer that softens when exposed to heat and returns to its original condition when cooled to room temperature. A "thermoset", as used herein, is defined to mean a polymer that solidifies and irreversibly "sets" or "crosslinks" when cured. In either of the Monosil or Sioplas processes described above, it is important to understand the careful balance of thermoplastic and thermoset properties of the various different materials used to produce the final thermoset microdense silane-crosslinked polyolefin elastomer or microdense sealing member. Each of the intermediate polymer materials mixed and reacted using a reactive twin screw extruder, a reactive single screw extruder, and/or a reactive single screw extruder are thermosets. Accordingly, the silane-grafted polyolefin blend and the foamed silane-crosslinkable polyolefin blend are thermoplastics and can be softened by heating so the respective materials can flow. Once the foamed silane-crosslinkable polyolefin blend is extruded, molded, pressed, and/or shaped into the uncured sealing element or other respective article, the foamed silane-crosslinkable polyolefin blend can begin to crosslink or cure at an ambient temperature and an ambient humidity to form the microdense sealing member and microdense silane-crosslinked polyolefin blend.

The thermoplastic/thermoset behavior of the foamed silane-crosslinkable polyolefin blend and corresponding microdense silane-crosslinked polyolefin blend are important for the various compositions and articles disclosed herein (e.g., microdense sealing members 12 shown in FIGS. 1, 2 and 4) because of the potential energy savings provided by using these materials. For example, a manufacturer can save considerable amounts of energy by being able to cure the foamed silane-crosslinkable polyolefin blend at an ambient temperature and an ambient humidity. This curing process is typically performed in the industry by applying significant amounts of energy to heat or steam treat crosslinkable polyolefins. The ability to cure the inventive foamed silane-crosslinkable polyolefin blend with ambient temperature and/or ambient humidity is a capability that is not necessarily intrinsic to crosslinkable polyolefins, but rather is a capability or property that is dependent on the relatively low density of the foamed silane-crosslinkable polyolefin blend (i.e., as compared to conventional EPDM and/or TPV materials). In some aspects, no additional curing overs, heating ovens, steam ovens, or other forms of heat producing machinery other than what was provided in the extruders are used to form the microdense silane-crosslinked polyolefin elastomers.

The specific gravity of the microdense silane-crosslinked polyolefin elastomer of the present disclosure may be lower than the specific gravities of conventional TPV- and EPDM-based formulations used in the art. The reduced specific gravity of these materials can lead to lower weight parts, thereby helping automakers meet increasing demands for improved fuel economy. For example, the specific gravity of the microdense silane-crosslinked polyolefin elastomer of the present disclosure may be from about 0.40 $g/cm^3$ to about 0.59 $g/cm^3$, from about 0.50 $g/cm^3$ to about 0.59 $g/cm^3$, from about 0.40 $g/cm^3$ to about 0.49 $g/cm^3$, less than 0.60 $g/cm^3$, less than 0.55 $g/cm^3$, less than 0.50 $g/cm^3$, or less than 0.45 g/cm³ as compared to existing TPV materials which may have a specific gravity of from 0.95 to 1.2 g/cm³ and EPDM materials which may have a specific gravity of from 1.0 to 1.35 g/cm³. The low specific gravity or density of the foamed silane-crosslinked polyolefin elastomer is attributable to the low crystallinity of the found in the Examples described below. In some aspects, the percent crystallinity of the foamed silane-crosslinked polyolefin elastomer is less than 10%, less than 20%, or less than 30%.

Figure 11:
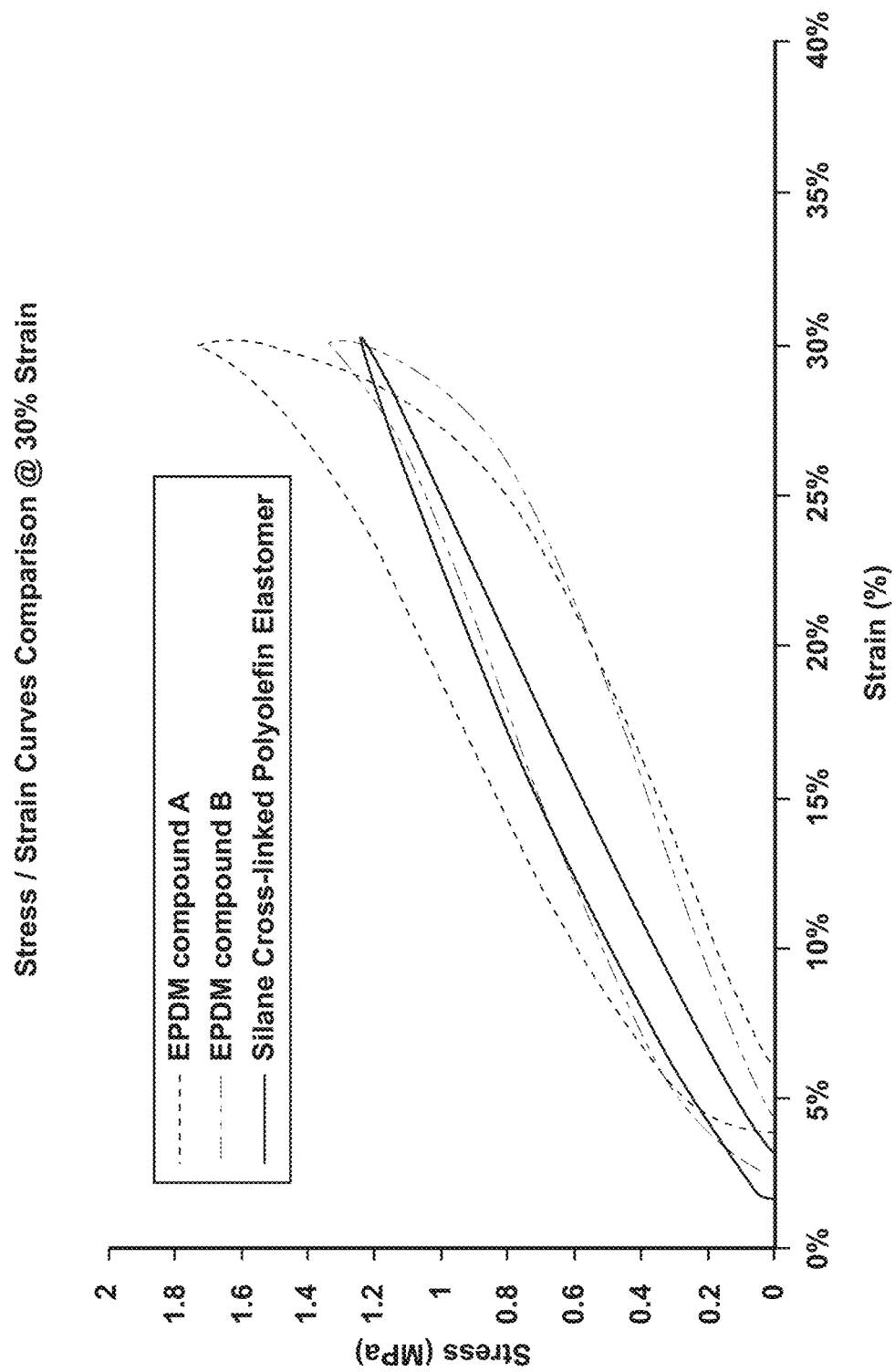
FIG. 11 is a graph illustrating the stress/strain behavior of a microdense silane-crosslinked polyolefin elastomer compared to EPDM compounds.

Referring now to FIG. 11, the stress/strain behavior of an exemplary silane-crosslinked polyolefin elastomer of the present disclosure (i.e., the "Silane-Crosslinked Polyolefin Elastomer" in the legend) relative to two comparative EPDM materials (i.e., the "EPDM compound A" and "EPDM compound B" in the legend) is provided. In particular, FIG. 11 displays a smaller area between the stress/strain curves for the microdense silane-crosslinked polyolefin of the disclosure, versus the areas between the stress/strain curves for EPDM compound A and EPDM compound B. This smaller area between the stress/strain curves for the silane-crosslinked polyolefin elastomer can be desirable for microdense sealing members, such as weatherstrips, used with automotive glass applications. Elastomeric materials typically have non-linear stress-strain curves with a significant loss of energy when repeatedly stressed. The silane-crosslinked polyolefin elastomers of the present disclosure may exhibit greater elasticity and less viscoelasticity (e.g., have linear curves and exhibit very low energy loss). Embodiments of the silane-crosslinked polyolefin elastomers described herein do not have any filler or plasticizer incorporated into these materials so their corresponding stress/strain curves do not have or display any Mullins effect and/or Payne effect. The lack of Mullins effect for these silane-crosslinked polyolefin elastomers is due to the lack of any reinforcing filler (e.g., carbon black) or plasticizer added to the silane-crosslinked polyolefin blend so the stress-strain curve does not depend on the maximum loading previously encountered where there is no instantaneous and irreversible softening. The lack of Payne effect for these silane-crosslinked polyolefin elastomers is due to the lack of any filler or plasticizer added to the silane-crosslinked polyolefin blend so the stress-strain curve does not depend on the small strain amplitudes previously encountered where there is no change in the viscoelastic storage modulus based on the amplitude of the strain.

The silane-crosslinked polyolefin elastomer or microdense sealing member can exhibit a compression set of from about 5.0% to about 30.0%, from about 5.0% to about 25.0%, from about 5.0% to about 20.0%, from about 5.0% to about 15.0%, from about 5.0% to about 10.0%, from about 10.0% to about 25.0%, from about 10.0% to about 20.0%, from about 10.0% to about 15.0%, from about 15.0% to about 30.0%, from about 15.0% to about 25.0%, from about 15.0% to about 20.0%, from about 20.0% to about 30.0%, or from about 20.0% to about 25.0%, as measured according to ASTM D 395 (22 hrs @ 23° C., 70° C., 80° C., 90° C., 125° C., and/or 175° C.).

In other implementations, the silane-crosslinked polyolefin elastomer or microdense sealing member can exhibit a compression set of from about 5.0% to about 20.0%, from about 5.0% to about 15.0%, from about 5.0% to about 10.0%, from about 7.0% to about 20.0%, from about 7.0% to about 15.0%, from about 7.0% to about 10.0%, from about 9.0% to about 20.0%, from about 9.0% to about 15.0%, from about 9.0% to about 10.0%, from about 10.0% to about 20.0%, from about 10.0% to about 15.0%, from about 12.0% to about 20.0%, or from about 12.0% to about 15.0%, from about 40.0% to about 80.0%, from about 40.0% to about 78.0%, as measured according to ASTM D 395 (22 hrs @ 23° C., 70° C., 80° C., 90° C., 125° C., and/or 175° C.).

The silane-crosslinked polyolefin elastomers and microdense sealing members of the disclosure may exhibit a crystallinity of from about 5% to about 40%, from about 5% to about 25%, from about 5% to about 15%, from about 10% to about 20%, from about 10% to about 15%, or from about 11% to about 14% as determined using density measurements, differential scanning calorimetry (DSC), X-Ray Diffraction, infrared spectroscopy, and/or solid state nuclear magnetic spectroscopy. As disclosed herein, DSC was used to measure the enthalpy of melting in order to calculate the crystallinity of the respective samples.

The silane-crosslinked polyolefin elastomers and microdense sealing members may exhibit a glass transition temperature of from about −75° C. to about −25° C., from about −65° C. to about −40° C., from about −60° C. to about −50° C., from about −50° C. to about −25° C., from about −50° C. to about −30° C., or from about −45° C. to about −25° C. as measured according to differential scanning calorimetry (DSC) using a second heating run at a rate of 5° C./min or 10° C./min.

The silane-crosslinked polyolefin elastomers and microdense sealing members may exhibit a weathering color difference of from about 0.25 ΔE to about 2.0 ΔE, from about 0.25 ΔE to about 1.5 ΔE, from about 0.25 ΔE to about 1.0 ΔE, or from about 0.25 ΔE to about 0.5 ΔE, as measured according to ASTM D2244 after 3000 hrs exposure to exterior weathering conditions.

EXAMPLES

The following non-limiting examples are exemplary of microdense sealing member, compositions and methods of making the same outlined in the disclosure.

Materials

All chemicals, precursors and other constituents were obtained from commercial suppliers and used as provided without further purification.

Example 1

Example 1 (Ex. 1) or ED76-4A was produced by extruding 82.55 wt % ENGAGE 8842 and 14.45 wt % MOSTEN TB 003 together with 3.0 wt % SILAN RHS 14/032 or SILFIN 29 to form a silane-grafted polyolefin elastomer. The Example 1 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into the form of an uncured microdense sealing member. The Example 1 foamed silane-crosslinkable polyolefin elastomer of the uncured microdense sealing member was then cured at ambient temperature and humidity to form a foamed silane-crosslinked polyolefin elastomer, consistent with the elastomers of the disclosure. The composition of Example 1 is provided in Table 1 below and the material properties associated with its foamed silane-crosslinked polyolefin blend are provided in Table 2 below.

Example 2

Example 2 (Ex. 2) or ED76-4E was produced by extruding 19.00 wt % ENGAGE 8150, 58.00 wt % ENGAGE 8842, and 20.00 wt % MOSTEN TB 003 together with 3.0 wt % SILAN RHS 14/032 or SILFIN 29 to form a silane-grafted polyolefin elastomer. The Example 2 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into an uncured microdense sealing member. The Example 2 foamed silane-crosslinkable polyolefin elastomer of the uncured microdense sealing member was then cured at ambient temperature and humidity to form a foamed silane-crosslinked polyolefin elastomer, consistent with the elastomers of the disclosure. The composition of Example 2 is provided in Table 1 below and the material properties associated with its foamed silane-crosslinked polyolefin blend are provided in Table 2 below.

Example 3

Example 3 (Ex. 3) or ED76-5 was produced by extruding 19.00 wt % ENGAGE 8150, 53.00 wt % ENGAGE 8842, and 25.00 wt % MOSTEN TB 003 together with 3.0 wt % SILAN RHS 14/032 or SILFIN 29 to form the silane-grafted polyolefin elastomer. The Example 3 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into an uncured microdense sealing member. The Example 3 foamed silane-crosslinkable polyolefin elastomer of the uncured microdense sealing member was then cured at ambient temperature and humidity to form a foamed silane-crosslinked polyolefin elastomer, consistent with the elastomers of the disclosure. The composition of Example 3 is provided in Table 1 below and the material properties associated with its foamed silane-crosslinked polyolefin blend are provided in Table 2 below.

Example 4

Example 4 (Ex. 4) or ED76-6 was produced by extruding 16.36 wt % ENGAGE 8150, 45.64 wt % ENGAGE 8842, and 35.00 wt % MOSTEN TB 003 together with 3.0 wt % SILAN RHS 14/032 or SILFIN 29 to form the silane-grafted polyolefin elastomer. The Example 4 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into an uncured microdense sealing member. The Example 4 foamed silane-crosslinkable polyolefin elastomer of the uncured microdense sealing member was then cured at ambient temperature and humidity to form a foamed silane-crosslinked polyolefin elastomer, consistent with the elastomers of the disclosure. The composition of Example 4 is provided in Table 1 below and the material properties associated with its foamed silane-crosslinked polyolefin blend are provided in Table 2 below.

TABLE 1

| Ingredients | Ex. 1 | Ex. 2 | Ex. 3 | Ex. 4 |
| --- | --- | --- | --- | --- |
| ENGAGE 8150 | — | 19.00 | 19.00 | 16.36 |
| ENGAGE 8842 | 82.55 | 58.00 | 53.00 | 45.64 |
| MOSTEN TB 003 | 14.45 | 20.00 | 25.00 | 35.00 |
| SILAN RHS 14/032 or SILFIN 29 | 3.00 | 3.00 | 3.00 | 3.00 |
| TOTAL | 100 | 100 | 100 | 100 |

TABLE 2

| Property | Test | Method | Units/Output | Ex. 1 | Ex. 2 | Ex. 3 | Ex. 4 |
| --- | --- | --- | --- | --- | --- | --- | --- |
| Physical Properties | Density | ASTM D297 | g/cc | 0.67 | 0.66 | 0.67 | 0.69 |
| | Hardness | ASTM D412 Die C | Shore A | 60 | 67 | 69 | 87 |
| | Tensile | ASTM D412 Die C | MPa | 5.0 | 7.2 | 8.7 | 7.6 |
| | Elongation | ASTM D412 Die C | % | 160 | 174 | 203 | 293 |
| | Tear C | ASTM D624 Die C | N/mm | 12.6 | 22.8 | 22.5 | 46.8 |
| Aged Properties | Hardness Heat Age (70 h/70° C.) | ASTM D573 | Change (Shore A) | 2 | 0 | 1 | 1 |
| | Tensile Heat Age (70 h/70° C.) | ASTM D573 | % Change | 12.6 | 5.5 | −0.8 | 7 |
| | Elongation Heat Age (70 h/70° C.) | ASTM D573 | % Change | −0.6 | −7.2 | −13.5 | −12.8 |
| Compression Set | Plied C/S (22 h/70° C.) | ASTM D395 Method B | % | 40 | 41 | 61 | 78 |
| Miscellaneous | Water Absorption | MS-AK-92 | % | 0.5 | 0.2 | 0.7 | 0.5 |
| | Ozone Resistance (168 h/40% Elongation) | ASTM D1149 | — | No Cracks | No Cracks | No Cracks | No Cracks |
| | Odor | SAE J1351 | No odor wet or dry | Pass | Pass | Pass | Pass |
| | Paint Staining (24 h/70° C.) | ASTM D925 Method A | — | No Staining | No Staining | No Staining | No Staining |

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the articles, processes and compositions, which are defined by the following claims as interpreted according to the principles of patent law, including the Doctrine of Equivalents.

LISTING OF NON-LIMITING EMBODIMENTS

Embodiment A is a microdense sealing member comprising: a composition comprising a foamed silane-crosslinked polyolefin elastomer having a density less than 0.70 g/cm$^3$, wherein the microdense sealing member exhibits a compression set of from about 40.0% to about 78.0%, as measured according to ASTM D 395 (22 hrs @ 70° C.).

The microdense sealing member of Embodiment A wherein the silane-crosslinked polyolefin elastomer comprises a first polyolefin having a density less than 0.86 g/cm$^3$, a second polyolefin having a percent crystallinity less than 40%, a silane crosslinker, a grafting initiator, a condensation catalyst, and a microencapsulated foaming agent.

The microdense sealing member of Embodiment A or Embodiment A with any of the intervening features wherein the compression set is from about 15.0% to about 35.0%, as measured according to ASTM D 395 (22 hrs @ 70° C.).

The microdense sealing member of Embodiment A or Embodiment A with any of the intervening features wherein the density is from about 0.60 g/cm$^3$ to about 0.69 g/cm$^3$.

The microdense sealing member of Embodiment A or Embodiment A with any of the intervening features wherein the silane-crosslinked polyolefin elastomer exhibits a crystallinity of from about 50% to about 75%.

The microdense sealing member of Embodiment A or Embodiment A with any of the intervening features wherein the silane-crosslinked polyolefin elastomer exhibits a glass transition temperature of from about −75° C. to about −25° C.

The microdense sealing member of Embodiment A or Embodiment A with any of the intervening features wherein the composition is a thermoset, but exhibits thermoplastic properties during processing.

The microdense sealing member of Embodiment A or Embodiment A with any of the intervening features wherein the microdense sealing member exhibits a weathering color difference of from about 0.25 ΔE to about 2.0 ΔE, as measured according to ASTM D2244.

The microdense sealing member of Embodiment A or Embodiment A with any of the intervening features further comprising: a coloring agent.

Embodiment B is a foamed silane-crosslinked polyolefin blend comprising: a first polyolefin having a density less than 0.86 g/cm$^3$; a second polyolefin having a percent crystallinity less than 40%; a silane crosslinker; and a microencapsulated foaming agent, wherein the foamed silane-crosslinked polyolefin blend exhibits a compression set of from about 40.0% to about 78.0%, as measured according to ASTM D 395 (22 hrs @ 70° C.), and wherein the foamed silane-crosslinked polyolefin blend has a density less than 0.70 g/cm$^3$.

The foamed silane-crosslinked polyolefin blend of Embodiment B wherein the first polyolefin comprises an ethylene octene copolymer from about 60 wt % to about 97 wt %.

The foamed silane-crosslinked polyolefin blend of Embodiment B or Embodiment B with any of the intervening features wherein the second polyolefin comprises a polypropylene homopolymer from about 10 wt % to about 35 wt % and/or a poly(ethylene-co-propylene).

The foamed silane-crosslinked polyolefin blend of Embodiment B or Embodiment B with any of the intervening features wherein the silane crosslinker comprises a vinyltrimethoxy silane from about 1 wt % to about 4 wt %.

The foamed silane-crosslinked polyolefin blend of Embodiment B or Embodiment B with any of the intervening features further comprising a non-metal condensation catalyst that comprises a sulfonic ester from about 1 wt % to about 4 wt %.

The foamed silane-crosslinked polyolefin blend of Embodiment B or Embodiment B with any of the intervening features wherein the blend has a density from about 0.60 g/cm$^3$ to about 0.69 g/cm$^3$.

The foamed silane-crosslinked polyolefin blend of Embodiment B or Embodiment B with any of the intervening features wherein the blend exhibits a crystallinity of from about 5% to about 25%.

The foamed silane-crosslinked polyolefin blend of Embodiment B or Embodiment B with any of the intervening features wherein the blend exhibits a glass transition temperature of from about −75° C. to about −25° C.

Embodiment C is a method for making a microdense sealing member, the method comprising: extruding a first polyolefin having a density less than 0.86 g/cm$^3$, a second polyolefin having a crystallinity less than 40%, a silane crosslinker, and a grafting initiator together to form a silane-grafted polyolefin blend; extruding the silane-grafted polyolefin blend, a condensation catalyst, and a microencapsulated foaming agent together to form a foamed silane-crosslinkable polyolefin blend; molding the foamed silane-crosslinkable polyolefin blend into an uncured microdense sealing element; and crosslinking the foamed crosslinkable-polyolefin blend of the uncured microdense sealing element at an ambient temperature and an ambient humidity to form the element into a microdense sealing member having a density from about 0.60 g/cm$^3$ to about 0.69 g/cm$^3$ and comprising a foamed crosslinked polyolefin blend, wherein the microdense sealing member exhibits a compression set of from about 40.0% to about 78.0%, as measured according to ASTM D 395 (22 hrs @ 70° C.).

The method of Embodiment C wherein the silane-grafted polyolefin blend and the foamed crosslinkable-polyolefin blend are thermoplastics, and the foamed crosslinked polyolefin blend of the microdense sealing member is a thermoset.

The method of Embodiment C or Embodiment C with any of the intervening features wherein the first polyolefin is an ethylene/α-olefin copolymer and the second polyolefin is a polypropylene homopolymer and/or a poly(ethylene-co-propylene).

What is claimed is:

1. A microdense sealing member comprising:
   a composition comprising a foamed silane-crosslinked polyolefin elastomer having a density less than 0.70 g/cm$^3$, a tensile strength ranging from 5.0 to 7.6 MPa as measured according to ASTM D412, a Shore A hardness ranging from 60 to 87 as measured according to ASTM D412, and a crystallinity of from about 5% to about 20%,
   wherein from about 1 wt % to about 20 wt % of the foamed silane-crosslinked polyolefin elastomer is a polypropylene filler having a crystallinity greater than 40%,
   wherein the foamed silane-crosslinked polyolefin elastomer does not display a Mullins effect or a Payne effect;
   wherein the foamed silane-crosslinked polyolefin elastomer and the microdense sealing member are thermosets; and
   wherein the microdense sealing member exhibits a compression set of from about 40.0% to about 78.0%, as measured according to ASTM D 395 (22 hrs @ 70° C.).

2. The microdense sealing member of claim 1, wherein the foamed silane-crosslinked polyolefin elastomer comprises
   a first polyolefin having a density less than 0.86 g/cm$^3$, wherein the first polyolefin is an ethylene/α-olefin copolymer,
   a second polyolefin having a percent crystallinity less than 40%, wherein the second polyolefin is a polypropylene/α-olefin copolymer or a blend of propylene/α-olefin copolymer with an ethylene/α-olefin copolymer,
   a silane crosslinker, a grafting initiator, a condensation catalyst, and a microencapsulated foaming agent.

3. The microdense sealing member of claim 1, wherein the foamed silane-crosslinked polyolefin elastomer comprises from about 3 wt % to about 10 wt % polypropylene filler and has a density of from about 0.60 g/cm$^3$ to about 0.69 g/cm$^3$.

4. The microdense sealing member of claim 1, wherein the foamed silane-crosslinked polyolefin elastomer exhibits a crystallinity of from about 5% to about 10%.

5. The microdense sealing member of claim 1, wherein the foamed silane-crosslinked polyolefin elastomer exhibits a glass transition temperature of from about −75° C. to about −25° C.

6. The microdense sealing member of claim 1, wherein the microdense sealing member exhibits a weathering color difference of from about 0.25 ΔE to about 2.0 ΔE, as measured according to ASTM D2244.

7. The microdense sealing member of claim 1, further comprising:
   a coloring agent.

8. A foamed silane-crosslinked polyolefin blend comprising:
   a first polyolefin having a density less than 0.86 g/cm$^3$, wherein the first polyolefin is an ethylene/α-olefin copolymer;
   a second polyolefin having a percent crystallinity less than 40%, wherein the second polyolefin is a propylene/α-olefin copolymer or a blend of propylene/α-olefin copolymer with an ethylene/α-olefin copolymer;
   from about 1 wt % to about 20 wt % polypropylene filler having a crystallinity greater than 40%;
   silane crosslinks; and
   a microencapsulated foaming agent,
   wherein the foamed silane-crosslinked polyolefin blend exhibits a compression set of from about 40.0% to about 78.0%, as measured according to ASTM D 395 (22 hrs @ 70° C.),
   wherein the foamed silane-crosslinked polyolefin blend has a density less than 0.70 g/cm$^3$,
   wherein the foamed silane-crosslinked polyolefin blend is a thermoset,
   wherein the foamed silane-crosslinked polyolefin blend exhibits a crystallinity of from about 5% to about 20%, and
   wherein the foamed silane-crosslinked polyolefin blend does not display a Mullins effect or a Payne effect.

9. The foamed silane-crosslinked polyolefin blend of claim 8, wherein the first polyolefin comprises from about 30 wt % to about 70 wt % of the foamed silane-crosslinked polyolefin blend.

10. The foamed silane-crosslinked polyolefin blend of claim 8, wherein the second polyolefin is a blend of propylene/α-olefin copolymer with an ethylene/α-olefin copolymer and the second polyolefin comprises from about 10 wt % to about 35 wt % of the foamed silane-crosslinked polyolefin blend.

11. The foamed silane-crosslinked polyolefin blend of claim 8, wherein the silane crosslinks are derived from a vinyltrimethoxy silane crosslinker.

12. The foamed silane-crosslinked polyolefin blend of claim 8, further comprising from about 0.25 wt % to about 8 wt % of a condensation catalyst.

13. The foamed silane-crosslinked polyolefin blend of claim 8, wherein the blend comprises from about 3 wt % to about 10 wt % polypropylene filler and has a density from about 0.60 g/cm$^3$ to about 0.69 g/cm$^3$.

14. The foamed silane-crosslinked polyolefin blend of claim 8, wherein the blend exhibits a crystallinity of from about 5% to about 10%.

15. The foamed silane-crosslinked polyolefin blend of claim 8, wherein the blend exhibits a glass transition temperature of from about −75° C. to about −25° C.

16. A method for making a microdense sealing member, the method comprising:
- extruding a first polyolefin having a density less than 0.86 g/cm$^3$, a second polyolefin having a crystallinity less than 40%, a polypropylene filler having a crystallinity greater than 40%, a silane crosslinker, and a grafting initiator together to form a silane-grafted polyolefin blend, wherein the polypropylene filler comprises from about 1 wt % to about 20 wt % of the silane-grafted polyolefin blend;
- extruding the silane-grafted polyolefin blend, a condensation catalyst, and a microencapsulated foaming agent together to form a foamed silane-crosslinkable polyolefin blend;
- molding the foamed silane-crosslinkable polyolefin blend into an uncured microdense sealing element; and
- crosslinking the foamed silane-crosslinkable polyolefin blend of the uncured microdense sealing element at an ambient temperature and an ambient humidity to form the element into a microdense sealing member having a density from about 0.60 g/cm$^3$ to about 0.69 g/cm$^3$ and comprising a foamed silane-crosslinked polyolefin blend,
- wherein the first polyolefin is an ethylene/α-olefin copolymer and the second polyolefin is a propylene/α-olefin copolymer or a blend of propylene/α-olefin copolymer with an ethylene/α-olefin copolymer,
- wherein the microdense sealing member exhibits a compression set of from about 40.0% to about 78.0%, as measured according to ASTM D 395 (22 hrs @ 70° C.),
- wherein the microdense sealing member exhibits a tensile strength ranging from 5.0 to 7.6 MPa as measured according to ASTM D412,
- wherein the microdense sealing member exhibits a Shore A hardness ranging from 60 to 87 as measured according to ASTM D412;
- wherein the microdense sealing member and the foamed silane-crosslinked polyolefin blend are thermosets,
- wherein the foamed silane-crosslinked polyolefin elastomer exhibits a crystallinity of from about 5% to about 20%,
- wherein the foamed silane-crosslinked polyolefin blend does not display a Mullins effect or a Payne effect, and
- wherein the foamed silane-crosslinkable polyolefin blend exhibits thermoplastic properties.

17. The method of claim 16, wherein the silane-grafted polyolefin blend and the foamed silane-crosslinkable polyolefin blend are thermoplastics, and the foamed silane-crosslinked polyolefin blend of the microdense sealing member is a thermoset.

18. The method of claim 16, wherein the foamed silane-crosslinked polyolefin elastomer exhibits a crystallinity of from about 5% to about 10%.

19. The method of claim 16, wherein the amount of polypropylene filler ranges from about 3 wt % to about 10 wt %.

* * * * *